US008938425B1

(12) United States Patent
Armangau et al.

(10) Patent No.: US 8,938,425 B1
(45) Date of Patent: Jan. 20, 2015

(54) MANAGING LOGICAL VIEWS OF STORAGE

(75) Inventors: Philippe Armangau, Acton, MA (US);
William Davenport, Burlington, MA (US); Jean-Pierre Bono, Westborough, MA (US); Marc A. De Souter, Wayne, NJ (US)

(73) Assignee: EMC Corporation, Hopkinton, MA (US)

( * ) Notice: Subject to any disclaimer, the term of this patent is extended or adjusted under 35 U.S.C. 154(b) by 328 days.

(21) Appl. No.: 13/173,622

(22) Filed: Jun. 30, 2011

(51) Int. Cl.
*G06F 7/00* (2006.01)
*G06F 17/30* (2006.01)

(52) U.S. Cl.
USPC .......................................................... 707/639

(58) Field of Classification Search
CPC ............... G06F 17/30088; G06F 17/30174; G06F 17/30575
USPC .......................................................... 707/639
See application file for complete search history.

(56) References Cited

U.S. PATENT DOCUMENTS

| 6,212,531 B1 * | 4/2001 | Blea et al. .............................. 1/1 |
| 8,200,638 B1 * | 6/2012 | Zheng et al. ................... 707/679 |
| 2003/0055972 A1 * | 3/2003 | Fuller et al. .................... 709/226 |
| 2005/0066225 A1 * | 3/2005 | Rowan et al. ....................... 714/5 |
| 2006/0010227 A1 * | 1/2006 | Atluri .............................. 709/217 |
| 2007/0022117 A1 * | 1/2007 | Keohane et al. ..................... 707/8 |
| 2007/0055703 A1 * | 3/2007 | Zimran et al. ................. 707/200 |
| 2007/0226443 A1 * | 9/2007 | Giampaolo ..................... 711/170 |
| 2008/0270694 A1 * | 10/2008 | Patterson et al. ............. 711/114 |
| 2009/0307388 A1 * | 12/2009 | Tchapda ........................... 710/33 |
| 2010/0153617 A1 * | 6/2010 | Miroshnichenko et al. ....... 711/6 |
| 2010/0169587 A1 * | 7/2010 | Atluri et al. .................... 711/155 |
| 2010/0169591 A1 * | 7/2010 | Atluri et al. .................... 711/162 |
| 2010/0211740 A1 * | 8/2010 | Rajan et al. .................... 711/114 |
| 2011/0196903 A1 * | 8/2011 | Giampaolo ..................... 707/822 |
| 2012/0095971 A1 * | 4/2012 | Shyam et al. .................. 707/690 |

\* cited by examiner

*Primary Examiner* — Rehana Perveen
*Assistant Examiner* — Mark E Hershley
(74) *Attorney, Agent, or Firm* — Deepika Bhayana; Krishnendu Gupta

(57) ABSTRACT

A method is used in managing logical views of storage. A logical view is created. The logical view includes a set of storage objects. A mapping object for the logical view is created. The mapping object manages access to the set of objects of the logical view. A snapshot copy of the logical view is created. The snapshot copy of the logical view shares a subset of the set of storage objects with the logical view. A version of the mapping object manages access to the snapshot copy.

20 Claims, 26 Drawing Sheets

MANAGING LOGICAL VIEWS OF STORAGE

BACKGROUND

1. Technical Field

This application relates to managing logical views of storage in data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in an hierarchy depending upon the size of a file where each level of indirect blocks includes pointers to indirect blocks at the next lower level. An indirect block at the lowest level of the hierarchy is known as a leaf indirect block.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

A file system based snapshot copy facility is described in Bixby et al. U.S. Patent Application Publication 2005/0065986 published Mar. 24, 2005, incorporated herein by reference. When a snapshot copy of a file is initially created, it includes only a copy of the file. Therefore the snapshot copy initially shares all of the data blocks as well as any indirect blocks of the file. When the file is modified, new blocks are allocated and linked to the file to save the new data, and the original data blocks are retained and linked to the inode of the snapshot copy. The result is that disk space is saved by only saving the difference between two consecutive versions of the file.

The sharing of file system data blocks conserves data storage for storing files in a data storage system. The snapshot copy facility is a space saving technology that enables sharing of file system data blocks among versions of a file.

A file system namespace is a point-in-time collection of files. A file system namespace presents a collection of files as a single virtual file system to a user such that the user may access a file and/or directory from the collection of files irrespective of a physical location of the file or directory. Files in a file system namespace are arranged in a hierarchy that is similar to a file system hierarchy in such a way that a user can create and remove files, move a file from one directory to another, or rename a file within the file system namespace. A file system namespace separates the details of physical address of a file system stored on a disk device from the logical representation of the file system to clients of a data storage system. A file system namespace allows a storage administrator of a data storage system to manage a file system without affecting how users view or access files within the file system.

Thus, a file system namespace enables users (or clients) to access shared file systems without requiring the users to maintain knowledge of where a physical file system of the shared file systems is located or how to access files of the physical file system through alternate paths in case of a change or failure. A file system namespace enables storage administrators add new capacity, bring new servers online, improve reliability of access, and manage load balancing and migration of files, backup files, migrate files from old technology to new technology without interrupting access of users or changing an addressing scheme used by the users.

While namespace have helped make data management much easier, they also come with a number of challenges, especially when creating snapshot copies of a namespace. It may be difficult or impossible for the conventional snapshot utility to create versions of a namespace.

SUMMARY OF THE INVENTION

A method is used in managing logical views of storage. A logical view is created. The logical view includes a set of storage objects. A mapping object for the logical view is created. The mapping object manages access to the set of objects of the logical view. A snapshot copy of the logical view is created. The snapshot copy of the logical view shares a subset of the set of storage objects with the logical view. A version of the mapping object manages access to the snapshot copy.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
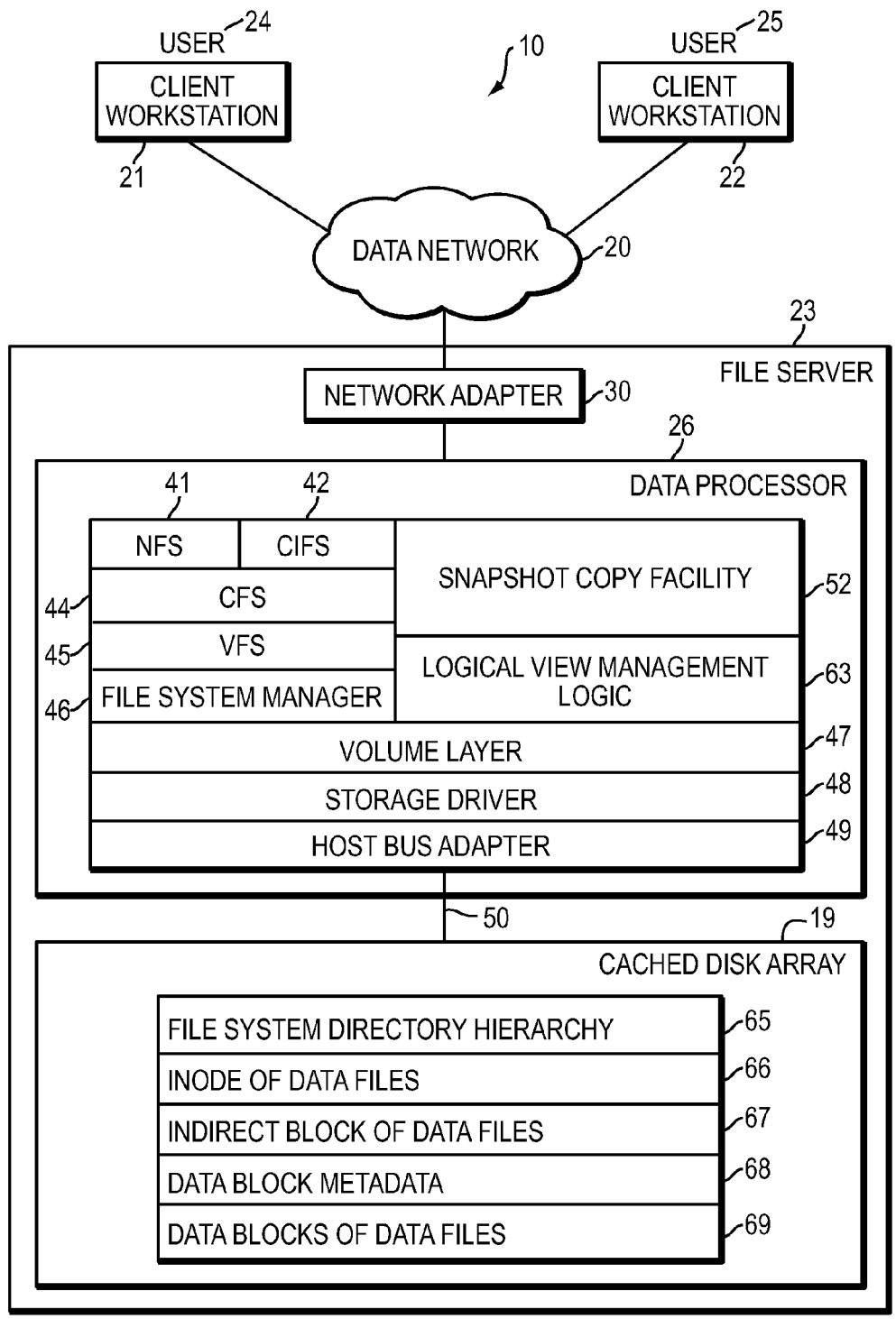
FIG. 1 is an example of an embodiment of a computer system that may utilize the techniques described herein.

Described below is a technique for use in managing logical views of storage, which technique may be used to provide, among other things, creating a logical view including a set of storage objects, creating a mapping object for the logical view that manages access to the set of objects of the logical view, and creating a snapshot copy of the logical view such that the snapshot copy of the logical view shares a subset of the set of storage objects with the logical view, and a version of the mapping object manages access to the snapshot copy.

In at least one storage system implementation as described below, managing logical views of storage includes creating a logical namespace view including a set of files, creating a namespace inode for the logical namespace view such that the namespace inode manages access to files of the set of files of the logical namespace view and includes a mapping for a real inode of each file of the set of files, and creating a snapshot copy of the logical namespace view such that the snapshot copy shares a subset of the set of files with the logical namespace view by sharing the namespace inode.

Generally, a namespace (also referred to as "namespace view" or simply as "view") is a point-in-time logical collection of storage objects such as files. Thus, a namespace is a collection of files selected from a file system at a point in time such that a user of a namespace view may access contents of files included in the namespace instead of viewing or accessing the entire contents of the file system. Typically, each file of a file system is represented by an inode. Thus a namespace including a set of files may be organized as a collection of inodes in such a way that an actual location of a file of the set of files may change on a storage device. However, a hierarchical structure represented by the namespace remains intact and does not change. Further, a namespace may be a collection of storage objects such as logical volumes.

Conventionally, a snapshot copy facility creates a replica of a file by creating a version of the file using a delegated reference counting mechanism. The delegated reference counting mechanism is described in co-pending U.S. patent application Ser. No. 12/494,115 for "Delegated reference count base file versioning" filed Jun. 29, 2009, which is incorporated herein by reference. In such a conventional system, a version file supports sharing of indirect blocks and data blocks by maintaining reference counts for these blocks. Generally, the delegated reference counting mechanism is used to track block usage and sharing of indirect blocks and data blocks of a file when data blocks and indirect blocks of the file are shared across versions of the file. However, in such a conventional system, a version of an inode of a file is not created, and thus the inode of the file is not shared among snapshot copies of the file. Further, in such a conventional system, contents of a file are accessed by the inode of the file (also referred to as "physical inode" or "real inode") where the inode indicates a fixed location on a storage device. In such a conventional system, a file may not be included in more than one name space view without creating a copy of the file. Thus, in such a conventional system, if a file included in a namespace is included in another namespace or a snapshot copy of the namespace, the snapshot copy facility creates a replica of a file by copying entire contents of the file and includes the replica of the file in the other namespace or the snapshot copy of the namespace. As a result, in such a conventional system, in order to create a snapshot copy of a namespace view, snapshot copies of all files included in the namespace view are created because each file is accessed by its real inode and is not shared among the namespace view and the snapshot copy of the namespace view. Thus, in such a conventional system, creating a snapshot copy of each file of a namespace view consumes a large amount of storage resources and memory of a data storage system. Therefore, given a limited amount of memory and/or storage resources, in at least some conventional systems, a data storage system may be able to manage only a limited number of namespace views and create a limited number of snapshot copies of a namespace view. Further, in such a conventional system, a storage object is accessed by a single mapping (e.g., a logical offset in a logical volume, a logical offset of a file).

By contrast, in at least some implementations in accordance with the current technique as described herein, inodes of files included in a namespace are shared between the namespace and a snapshot copy of the namespace by creating an inode file that virtualizes the inodes of the files included in the namespace. Further, in at least one implementation in accordance with the current technique, a snapshot copy of a primary namespace is created by creating a version of the namespace inode of the primary namespace using the delegated reference counting mechanism. Thus, in at least one embodiment of the current technique, an inode of a file is shared among a primary namespace view and snapshot copies of the primary namespace view such that the file is accessed by a virtual inode number instead of a real inode number. Further, in at least one embodiment of the current technique, a virtual inode number of a file remains the same when the file is shared among a primary namespace view and snapshot copies of the primary namespace view. Additionally, in at least one embodiment of the current technique, a file handle that is used to access a file of a namespace view includes a virtual inode number of the file, and a file system identifier of the namespace view such that the file may be shared among versions of the namespace view where a real inode number of a file or version of file on a storage device may change but the virtual inode number remains same. Thus, in at least one embodiment of the current technique, a virtual inode number of a file virtualizes the real inode of the file such that the file or a version of the file may be accessed from a namespace view or snapshot copy of the namespace view by using the virtual inode number. Further, in at least one embodiment of the current technique, a storage object is accessed by a mapping (e.g. a double mapping) where a virtual inode of a file is mapped to a real inode of the file, and the real inode is used to access contents of the file. Additionally, in at least one embodiment of the current technique, upon modification of a file, the inode of the file is "split" among a namespace view and snapshot copies of the namespace views by using the delegated reference counting mechanism.

Generally, a logical view (e.g. namespace view) is a point-in-time collection of files where each file is accessed by an inode. Thus, in at least one embodiment of the current technique, a logical view is a point-in-time collection of inodes where a metadata object such as a namespace inode stores information regarding collection of inodes in an inode file. Thus, in at least one embodiment of the current technique, a logical view (e.g. namespace view) includes a namespace inode for storing an inode file. In at least one embodiment of the current technique, a namespace inode defines a logical view and virtualizes the real inode of each file included in the logical view. Further, in at least one embodiment of the current technique, an inode file created for a logical view (e.g. namespace) includes a mapping for each file included in the logical view such that the mapping associates a real inode of a file to a virtual inode number of the file. In at least one embodiment of the current technique, a snapshot copy facility creates versions of an inode file using the delegated reference counting mechanism. A namespace inode for an inode file of a namespace view differs from a traditional inode of a file such that leaf-level indirect blocks of the namespace inode points to inodes of files included in the namespace view instead of file system data blocks. Further, in at least one embodiment of the current technique, a logical block offset (also referred to as "logical block number" or simply as "LBN") within a leaf level indirect block of a namespace inode indicates a virtual inode number of a file associated with a real inode number stored at the logical block offset within the leaf level indirect block.

In at least some implementations in accordance with the technique as described herein, the use of the managing logical views of storage technique can provide one or more of the following advantages: lowering storage cost by removing or reducing the need to create duplicate copies of each file of a set of files of a namespace view, reducing the amount of storage required for managing logical views of storage by creating versions of an inode of a file, and improving memory and storage utilization by creating a virtual inode for each file of the set of files of a namespace view.

Referring now to FIG. 1, shown is an example of an embodiment of a data storage system that may be used in connection with performing the technique or techniques described herein. The data storage system 10 includes a data network 20 interconnecting clients 21, 22 and servers such as a network file server 23 (also referred to simply as "file server"). The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 1, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The snapshot copy facility 52 performs a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 20 may be any one or more of a variety of networks or other type of communication connections as known to those skilled in the art. For example, the data network 20 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 1, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 1, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIG. 5. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

In at least one embodiment of the current technique, snapshot copy facility 52 interacts with logical view management logic 63 for managing logical views of storage, and creating versions of a namespace view. Further, in at least one embodiment of the current technique, snapshot copy facility 52 extends the delegated reference counting mechanism for managing sharing of indirect blocks and data blocks of a file to managing sharing of the inode of a file.

Figure 2:
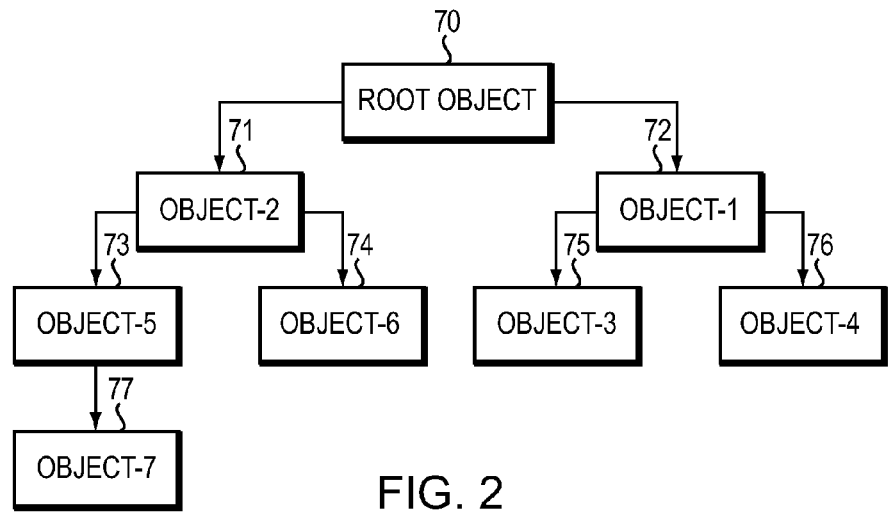
FIGS. 2-9 are diagrams illustrating in more detail components that may be used in connection with techniques herein.

Referring to FIG. 2, shown is an illustration of an example representing a hierarchy of storage objects that may be included in an embodiment using the techniques described herein. In at least one embodiment of the current technique, a set of storage objects (e.g. files, logical volumes) may be organized as a hierarchy with a root object 70 at the top of the hierarchy. Root object 70 may include object-2 71 and object-1 72. Object-2 71 may further include object-5 73 and object-6 74. Similarly, object-1 72 may include object-3 75 and object-4 76. Additionally, object-5 73 may include object-7 77.

Figure 3:
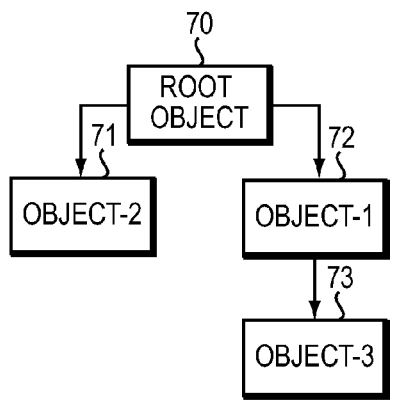

Referring to FIG. 3, shown is an illustration of an example representing a first logical view of the hierarchy of storage objects of FIG. 2 that may be included in an embodiment using the techniques described herein. For example, in at least one embodiment of the current technique, a logical view named "A" may include a subset of storage objects from the set of storage objects shown in FIG. 2. Thus, in at least one embodiment of the current technique, for example, the logical view "A" may be a point-in-time collection of storage objects such as root object 70, object-2 71, object-1 72, and object-3 73 such that a user of the logical view "A" may access contents of storage objects included in the logical view "A" as shown in FIG. 3 instead of viewing or accessing the entire storage hierarchy shown in FIG. 2.

Figure 4:
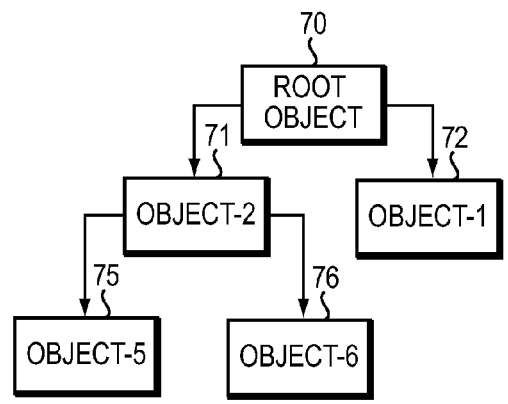

Referring to FIG. 4, shown is an illustration of an example representing a second logical view of the hierarchy of storage objects of FIG. 2 that may be included in an embodiment using the techniques described herein. For example, in at least one embodiment of the current technique, a logical view named "B" may include a subset of storage objects from the set of storage objects shown in FIG. 2. Thus, in at least one embodiment of the current technique, for example, the logical view "B" may be a point-in-time collection of storage objects such as root object 70, object-2 71, object-1 72, object-5 75, and object-6 76 such that a user of the logical view "B" may access contents of storage objects included in the logical view "B" instead of viewing or accessing the entire storage hierarchy shown in FIG. 2.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 5:
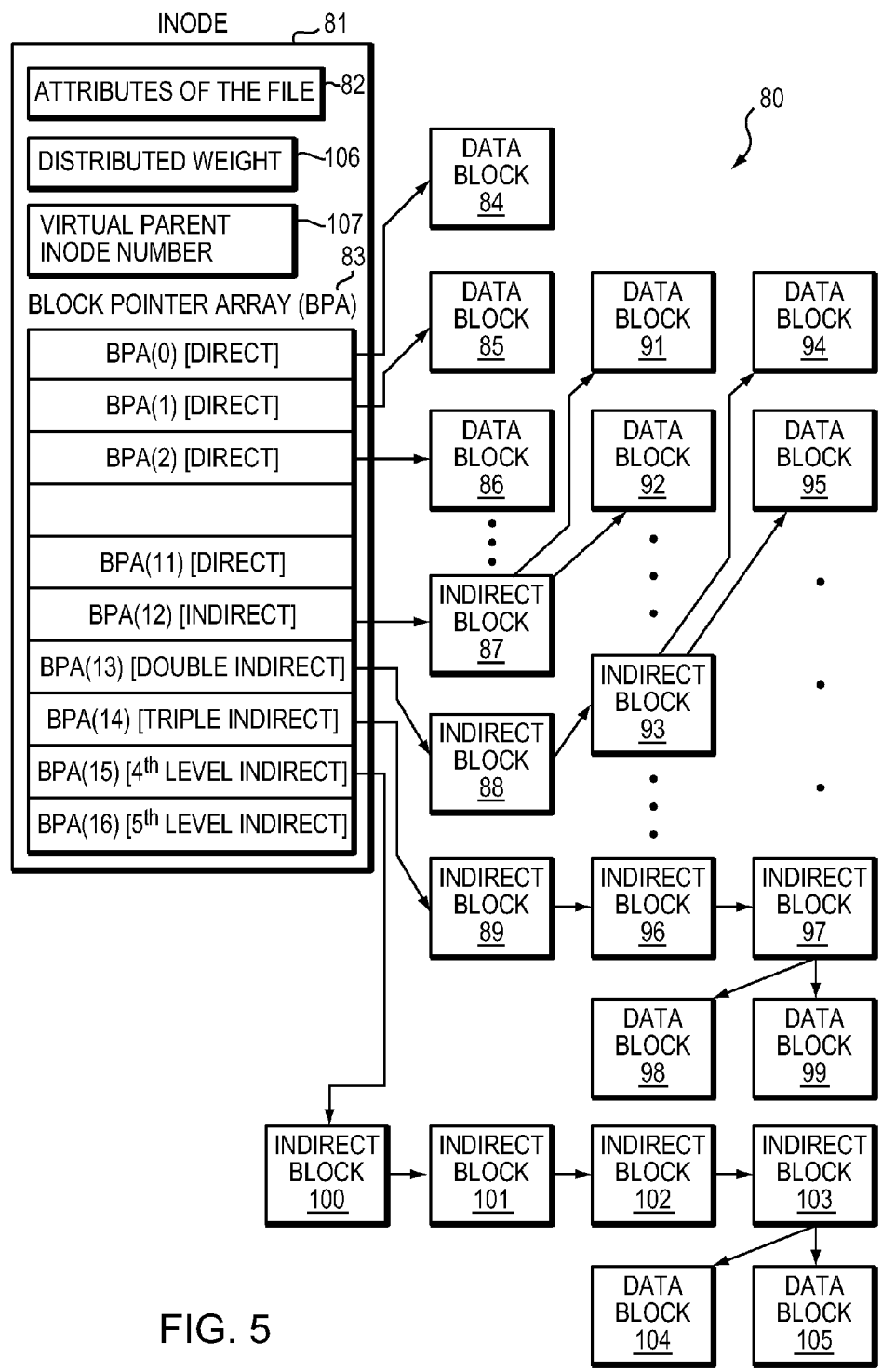

Referring to FIG. 5, shown is a representation of an inode of a file that may be included in an embodiment using the techniques described herein. A file includes an inode 81 containing attributes 82 of the file, and a block pointer array 83. The block pointer array 83 has seventeen block pointer array entries BPA(0) to BPA(14). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

In at least one embodiment of the current technique, the inode 81 of a file includes a distributed weight 106 that indicates a sum of delegated reference counts (also referred to as "weight") of the real inode associated with each version of the file shared among a namespace view and snapshot copies of the namespace view. Further, in at least one embodiment of the current technique, inode 81 of a file includes a virtual parent inode number 107 indicating an inode number of a storage object (e.g. file, directory) under which the file is organized in a hierarchy structure.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block. Further, a mapping pointer of a file system block includes metadata information for the file system block such as a weight that indicates a delegated reference count for the mapping pointer. The delegated reference count is used by the snapshot copy facility 52 when a replica of a file is created. Mapping pointers of the inode of the file are copied and included in the inode of the replica of the file. Mapping pointers of the inode may include mapping pointers pointing to direct data blocks and mapping pointers pointing to indirect data blocks. The delegated reference count values stored in the mapping pointers of the file and the replica of the file are updated to indicate that the file and the replica of the file share data blocks of the file.

With reference also to FIG. 1, as introduced above herein, the file-system based snapshot copy facility 52 needs a way of maintaining block ownership information for indicating whether or not each indirect block or data block of a file or a snapshot copy ("replica" or "version") of the file is shared with another version of the file. This block ownership information is accessed each time that the snapshot copy facility 52 writes new data to a file, and each time that the snapshot copy facility 52 deletes a snapshot copy. Further, as introduced above, files in the data storage system 10 are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information for a snapshot copy facility 52 is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Figure 6:
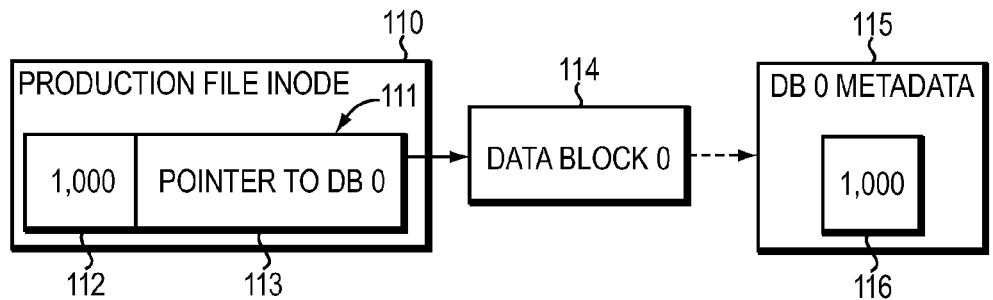

As shown in FIG. 6, for example, a production file inode 110 (also referred to as "working file") includes a mapping pointer field 111 containing a delegated reference count 112 and a block pointer 113 pointing to a first file system data block 114. The block pointer 114 is a file system block number of the first data block 114. The first data block 114 has associated per-block metadata 115 including a reference count 116. The per-block metadata 115 of the first data block 114, for example, is organized as table separate from the first data block 114 and indexed by the block number of the first data block 114.

In the example of FIG. 6, the delegated reference count 112 is associated with the parent-child block relationship indicated by the block pointer 113 by storing the delegated reference count in one or more bytes of the mapping block pointer field 111. The delegated reference count 112, however, could be associated with the parent-child block relationship in other ways. For example, the delegated reference count could be stored in a metadata table of the production file inode 110.

In the example of FIG. 6, the delegated reference count 112 has an initial full-weight value of 1,000, and the reference count 116 in the per-block metadata 115 of the first data block 114 also has an initial full-weight value of 1,000. In other words, the initial full-weight value of 1,000 should be understood as representing a full ownership interest (i.e., a 100% ownership interest) of the file system data block. The snapshot copy facility 52 delegates a partial ownership interest to a snapshot copy when sharing occurs between a snapshot copy and a production file.

Figure 7:
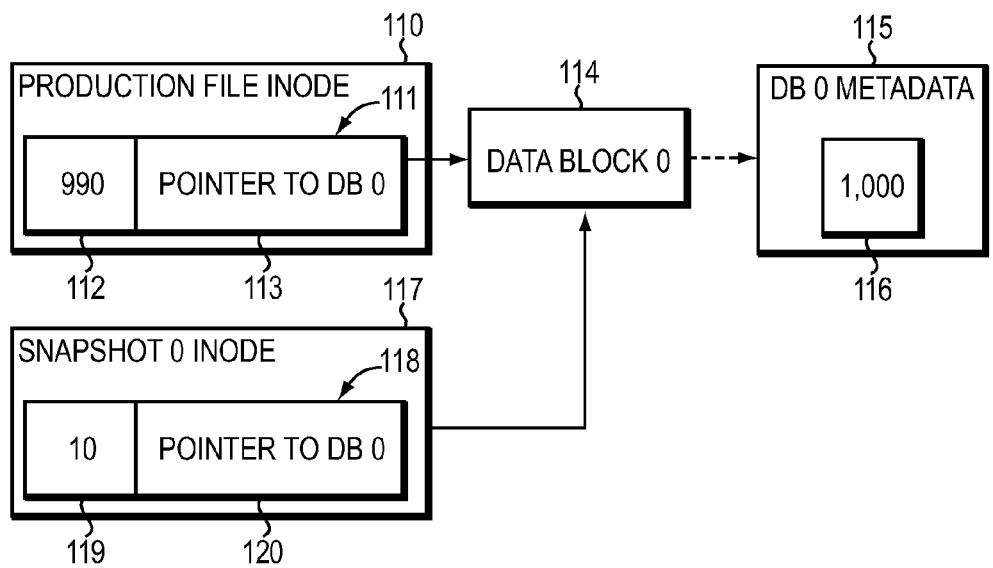

As shown in FIG. 7, when the snapshot copy facility 52 creates a first snapshot copy of the production file, the snapshot copy facility allocates an inode 117 for the snapshot copy, and copies the content of the production file inode 110 into the snapshot copy inode 117. Then the snapshot copy facility 52 decrements the delegated reference count 112 in the mapping block pointer field 111 of the production file inode 110 by a partial-weight value of 10, and sets the delegated reference count 119 in the mapping block pointer field 118 of the snapshot inode 117 to the same partial-weight value of 10. Block pointer 120 of the mapping pointer 118 in snapshot inode 117 of the snapshot copy of production file now points to the same file system data block 114 and thus indicates that file system data block 114 is shared by the production file and the snapshot copy of the production file.

Although in general a partial-weight value is simply smaller than a full-weight value, in most cases the ratio of the full-weight value to the partial-weight value may be greater than the maximum number of snapshot copies of a production file. For some applications, a relatively small partial weight in relationship to a limited number of snapshot copies would also permit identification of child blocks exclusively owned or shared only among snapshot files, permitting a rapid delete of all snapshot copies simply by scanning for file system blocks having a reference count value below a certain threshold, and de-allocating all such blocks.

Figure 8:
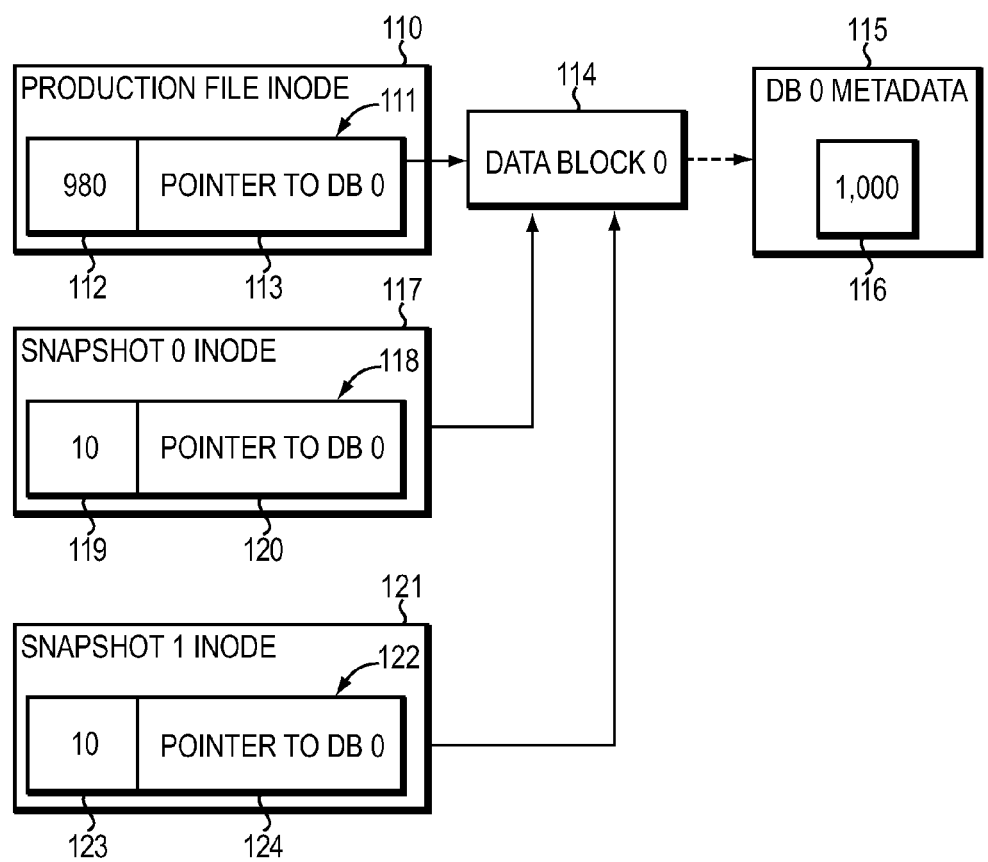

As shown in FIG. 8, when the snapshot copy facility 52 creates a second snapshot copy of the production file, the snapshot copy facility 52 allocates an inode 121 for the second snapshot copy, and copies the content of the production file inode 110 into the second snapshot copy inode 121. Then the snapshot copy facility 52 decrements the delegated reference count 112 in the mapping block pointer field 111 of the production file inode 110 by a partial-weight value of 10, and sets the delegated reference count 123 in the mapping block pointer field 122 of the second snapshot inode 121 to the same partial-weight value of 10. Thus, block pointer 124 of the mapping pointer field 122 in the second snapshot copy of the production file now points to the same file system data block 114 and indicates that file system data block 114 is now shared by the production file, the first snapshot copy and the second snapshot copy.

Figure 9:
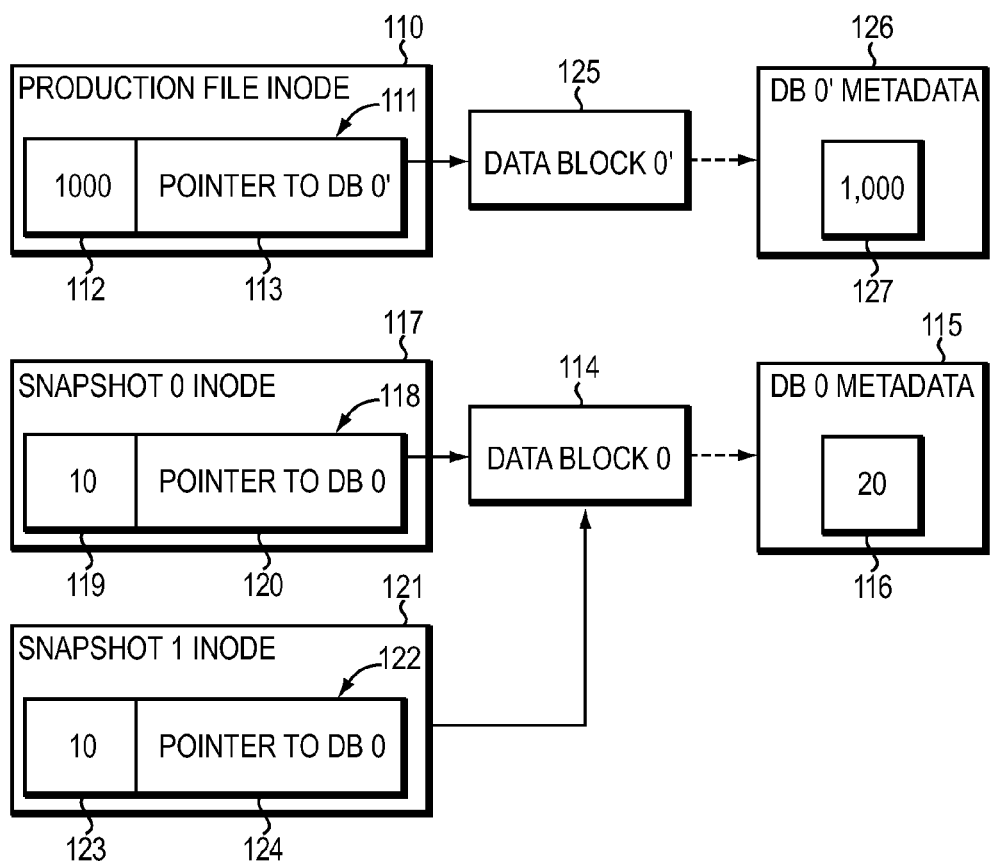

As shown in FIG. 9, with reference also to FIG. 8, when the snapshot copy facility 52 writes to the first data block of the production file, it allocates a new data block 125 and writes to the new data block 125 and sets the reference count 127 in the per-block metadata 126 of the new data block 125 to a full-weight value of 1,000, and decrements the reference count 116 in the per-block metadata 115 of the old data block 114 by the delegated reference count 112 associated with the mapping pointer of the old data block 114 (resulting in a decremented reference count of 20), and changes the block pointer 113 to point to the new data block 125, and resets the delegated reference count 112 to a full-weight value of 1,000. Thus, file system data block 114 no longer remains shared between the production file and snapshot copies of the production file.

In general, the delegated reference counting mechanism as shown in FIGS. 6-9 results in the reference count in the per-block metadata of a child block of a file system being equal to the sum of all the delegated reference counts associated with all of the child's parent blocks in the file system block hierarchy of the file system. The block sharing caused by creation of snapshot copies does not change the reference count in the per-block metadata of a child block, but the deletion of the production file or a snapshot copy will decrement the reference count in the per-block metadata of a child block by a full weight or a partial weight depending on whether or not the deleted version did not share the child block with a related version or did share the child block with a related version.

Figure 10:
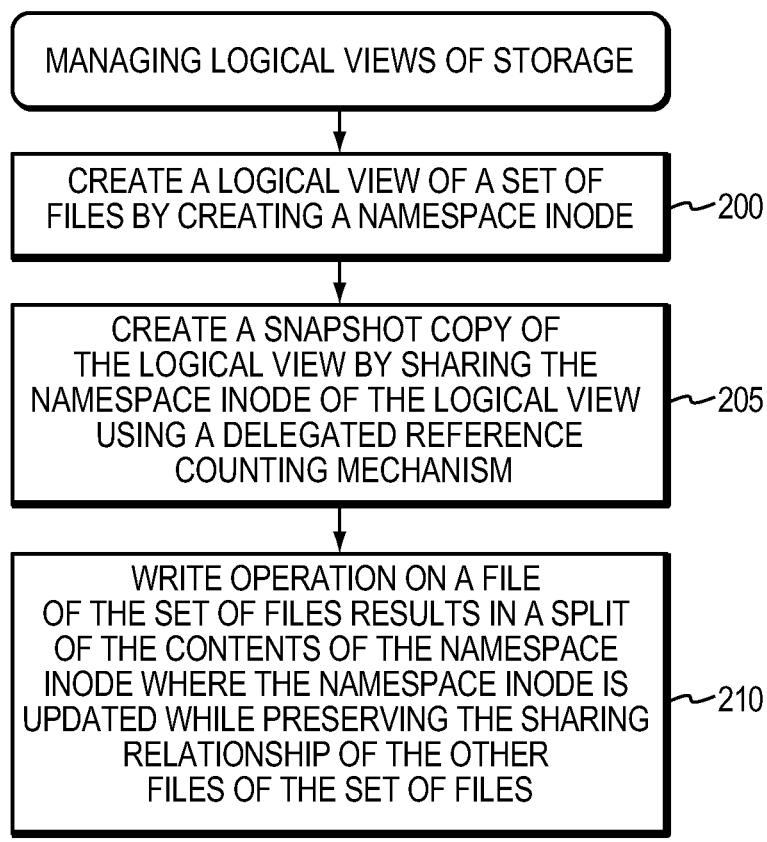
FIG. 10 is a flow diagram illustrating processes that may be used in connection with techniques herein.

Referring to FIG. 10, shown is a flow diagram illustrating a flow of data in the data storage system. With reference also to FIG. 1, managing logical views of storage in a data storage system 10 includes creating a logical view of a set of storage objects (e.g. file, logical volume), creating snapshot copies of the logical view by creating a metadata object such as a namespace inode that virtualizes the access to the set of storage objects in such a way that the set of storage objects are shared by the logical view and the snapshot copies of the logical view by using the delegated reference counting mechanism. In at least one embodiment of the current technique, a logical view of a set of files is created by creating a namespace inode that includes a mapping of a real inode for each file of the set of files of the logical view to a virtual inode of each file (step 200). The snapshot copy facility 52 working in conjunction with logical view management logic 63 creates a snapshot copy of the logical view by sharing the namespace inode of the logical view with the snapshot copy of the logical view using a delegated reference counting mechanism (step 205). A write operation directed to a file of the set of files results in an inode split of the namespace inode where a version of the namespace inode is updated while preserving the sharing relationship of the other files of the set of files (step 210). The inode split operation includes creating a new version of the namespace inode for sharing the set of files between the logical (also referred to as "primary") view and the snapshot copy of the logical view. Then, a new version of the real inode is created for the file by using the delegated reference counting mechanism.

Figure 11:
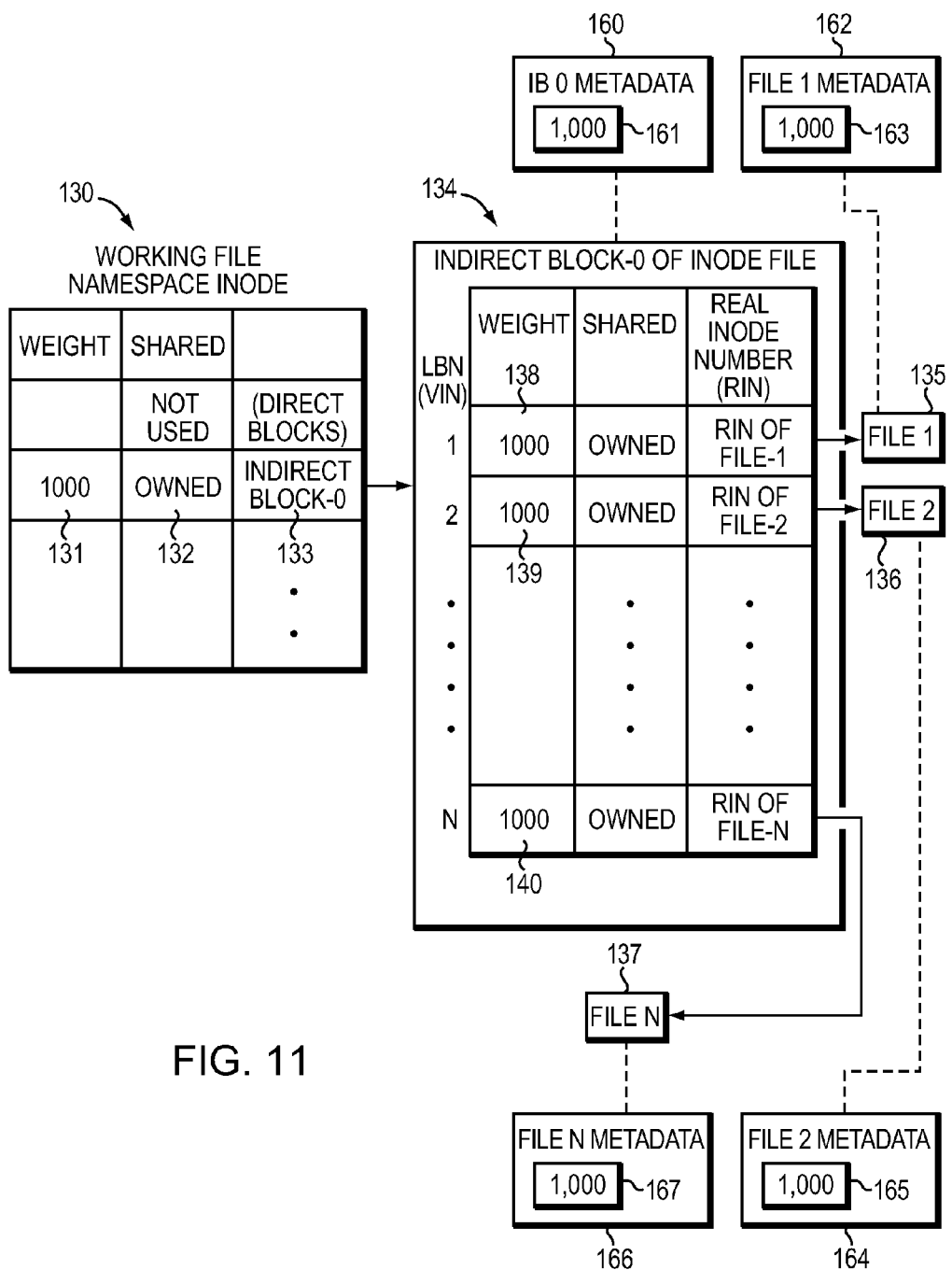
FIG. 11 is a block diagram illustrating in more detail components that may be used in connection with techniques herein.

Referring to FIG. 11, shown is an illustration of an example representing a primary namespace view including a set of files that may be included in an embodiment using the techniques described herein. For example, in at least one embodiment, a primary (or "working") namespace view includes a set of files such as file-1 135, file-2 136, and file-n 137 (files between files-2 and file-n are not shown). A namespace inode 130 is created for the primary namespace view. The primary namespace inode 130 includes a delegated reference count for each indirect block pointer of namespace inode 130, information regarding whether an indirect block pointed to by each indirect block pointer is shared by snapshot copies of the primary namespace view. For example, indirect block-0 pointer 133 of namespace inode 130 for the primary namespace view includes a delegated reference count 131 associated with the parent-child relationship indicated by the indirect block pointer 133 and indirect block 134. In the example of FIG. 11, delegated reference count 131 has an initial full-weight value of 1,000. Indirect block 134 pointed to by indirect block-0 pointer 133 associated with an inode file that stores information regarding the set of files included in the primary namespace view. Initially, at the time of creation of the primary namespace view, indirect blocks of the primary namespace inode 130 for the primary namespace view are owned by the primary namespace inode 130 indicating that no sharing relationship exists at that point in time. Thus, metadata 160 for indirect block 134 includes delegated weight 161 with initial full-weight value of 1,000. Further, shared information 132 for indirect block-0 pointer 133 indicates that the indirect block-0 134 is owned by the primary namespace inode 130 for the primary namespace view and is not shared by any other view. Each entry of the indirect block-0 134 associated with the inode file includes information for a file of the set of files included in the primary namespace view. For example, an entry 138 at the logical block offset "1" stores information regarding file-1 135. A logical block offset within the indirect block-0 134 indicates a virtual inode number (also referred to as "VIN") for a file. Thus, the virtual inode number associated with a real inode number (also referred to as "RIN") of file-1 135 is 1. Indirect block entry 138 includes a delegated reference count for the inode of file-1 135 where the distributed weight included in the real inode of file-1 135 is equivalent to the initial delegated reference count stored in indirect block-0 entry 138 associated with the real inode of the file-1 135. In the example of FIG. 11, the delegated reference count for file-1 135 has an initial full-weight value of 1,000. Thus, metadata 162 of file-1 135 includes delegated weight 163 that has initial full-weight value of 1,000. Similarly, an indirect block entry 139 at the logical block offset of 2 stores information regarding file-2 136. Indirect block entry 139 includes a delegated reference count for the inode of file-2 136. In the example of FIG. 11, the delegated reference count for file-2 136 has an initial full-weight value of 1,000. Also, the virtual inode number associated with a real inode number of file-2 136 is the logical block offset value of 2. Thus, metadata 164 of file-2 136 includes delegated weight 165 that has initial full-weight value of 1,000. Similarly, an indirect block entry 140 at the logical block offset of n stores information regarding file-n 137. Indirect block entry 140 includes a delegated reference count for the inode of file-n 137. In the example of FIG. 11, the delegated reference count for file-n 137 has an initial full-weight value of 1,000. Also, the virtual inode number associated with a real inode number of file-n 137 is the logical block offset value of n. Thus, metadata 166 of file-n 137 includes delegated weight 167 that has initial full-weight value of 1,000. Additionally, it should be noted that column "shared" of the indirect block-0 134 shown in FIG. 11 is only for the purpose of illustration for indicating that inodes of files included in the inode file 14 of the primary namespace inode 130 are not shared at the time the primary namespace inode 130 is created for the primary namespace view. In at least one embodiment of the current technique, when the primary namespace inode of a primary namespace view is shared by a snapshot copy of the primary namespace view by creating a version of the primary namespace inode, the entire hierarchy of parent-child relationships starting from the primary namespace inode is assumed to inherit the sharing status indicated by sharing information stored in the primary namespace inode.

In at least one embodiment of the current technique, the delegated reference counting mechanism when enhanced to create a version of an inode of a file results in the reference count in the per-block metadata of a child block of a storage hierarchy indicated by an inode file (e.g. real inode of a file) being equal to the sum of all the delegated reference counts associated with all of the child's parent blocks in the storage hierarchy (e.g. namespace inode).

Figure 12:
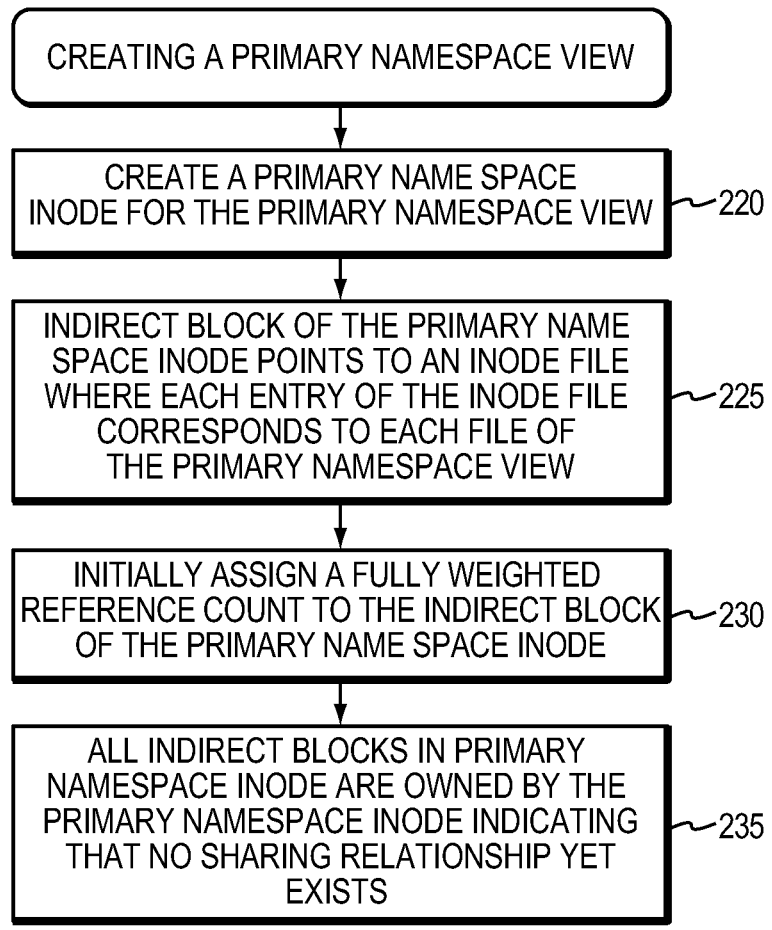
FIG. 12 is a flow diagram illustrating processes that may be used in connection with techniques herein.

Referring to FIG. 12, shown is a flow diagram illustrating a flow of data in the data storage system. With reference also to FIGS. 10 and 11, a primary (or working) namespace view is created from a set of files in a data storage system. A primary name space inode is created for the primary namespace view (step 220). An indirect block pointer of the primary namespace inode points to an indirect block containing an inode file where each entry of the inode file corresponds to each file of the set of files of the primary namespace view (step 225). A logical block offset ("LBN") of the indirect block of the primary namespace inode is mapped to a real inode number ("RIN") of a file of the set of files included in the primary namespace view. A logical block offset mapped to a real inode of a file is used as a virtual inode number (VIN) for that file. Thus, each entry of the inode file of the primary namespace inode is mapped to a real inode of each file of the set of files of the primary namespace view. Further, the real inode of each file of the set of files of the primary namespace view is updated to include a parent virtual inode number. A parent virtual inode number for a file indicates the virtual inode number of a directory under which the file is stored or organized. Initially, a fully weighted reference count is assigned to the indirect block of the primary namespace inode (step 230). Indirect blocks of the primary namespace inode are owned by the primary namespace inode indicating that no sharing relationship exists at the time the primary namespace view is created (step 235). Consequently, initially a fully weighted reference count is assigned to each entry of the indirect block of the primary namespace inode such that the distributed weight in the real inode of a file associated with each indirect block entry is equivalent to the initial delegated reference count stored in the indirect block entry associated with the real inode of the file. Further, in order to share contents of each file of the set of files between the primary namespace view and a snapshot copy of the primary namespace view, initially a fully weighted reference count is assigned to each block pointer field in the real inode of a file and each indirect block of the file and to the metadata of each indirect block of the file and each file system data block of the file based on the delegated reference counting mechanism.

It should be noted that there may not be a 1-1 correspondence between a logical offset and a logical block number ("LBN"). Thus, it should be noted that there may not be a 1-1 correspondence between a virtual inode number and a logical block number. Depending on the implementation, a logical block number may include more than one logical offset and thus may include more than one virtual inode number.

Figure 13:
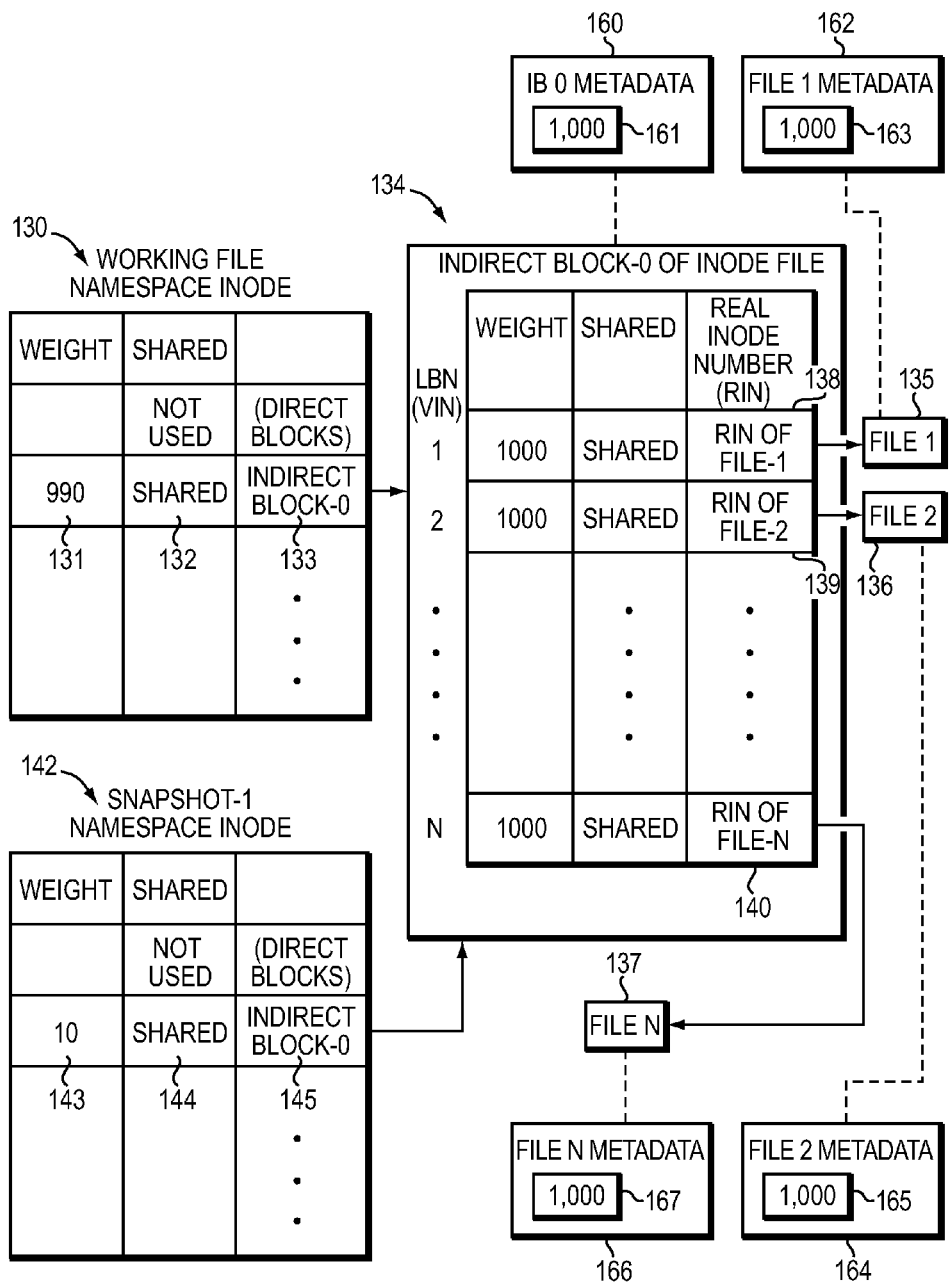
FIG. 13 is a block diagram illustrating in more detail components that may be used in connection with techniques herein.

Referring to FIG. 13, shown is an illustration of an example representing a snapshot copy of the primary namespace view of FIG. 11 that may be included in an embodiment using the techniques described herein. With reference also to FIG. 11, a snapshot copy of the primary namespace view is created by creating a snapshot copy of the primary namespace inode 130 using the delegated reference counting mechanism described above herein. When the snapshot copy facility 52 creates a first snapshot copy of the primary namespace view, the snapshot copy facility 52 allocates a snapshot namespace inode 142 for the snapshot copy, and copies the contents of the primary namespace inode 130 into the snapshot namespace inode 142. Then, the snapshot copy facility 52 decrements the delegated reference count 131 in the indirect block-0 pointer field of the primary namespace inode 130 by a partial-weight value of 10, and sets the delegated reference count 143 in the indirect block-0 pointer field of the snapshot namespace inode 142 to the same partial-weight value of 10. Thus, delegated weight 161 of indirect block-0 134 which is total of the delegated reference count 131 of the primary namespace inode 130 and delegated reference count 143 of the snapshot namespace inode 142 stays same with value of 1,000. Indirect block-0 pointer 145 in snapshot namespace inode 142 for the snapshot copy of the primary namespace view is updated to point to the same indirect block-0 134, and thus indicates that inode file for the primary namespace view included in the indirect block-0 134 is shared by the primary namespace view and the snapshot copy of the primary namespace view. Further, sharing information 132 in the primary namespace inode 130 is updated to indicate that the inode file for the primary namespace inode 130 is shared by the primary namespace view and the snapshot copy of the primary namespace view, which in turns implies that the set of files included in the primary namespace view are shared by the primary namespace view and the snapshot copy of the primary namespace view.

Figure 14:
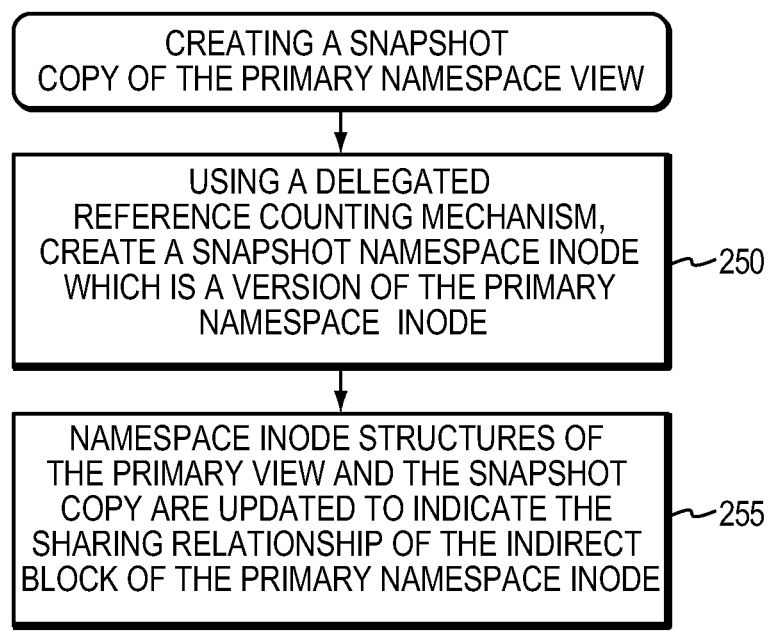
FIG. 14 is a flow diagram illustrating processes that may be used in connection with techniques herein.

Referring to FIG. 14, shown is a flow diagram illustrating a flow of data in the data storage system. With reference also to FIGS. 10-13, snapshot copy facility 52 creates a snapshot copy of a primary namespace view by creating a snapshot copy (or "version") of the primary namespace inode 130 for the primary namespace view using the delegated reference counting mechanism (step 250). Contents of the primary namespace inode structure 130 are copied to the newly created snapshot namespace inode 142. An indirect block pointer 145 of the snapshot namespace inode 142, and the indirect block pointer 133 of the primary namespace inode 130 point to the indirect block 134 containing the inode file for the primary namespace view. The delegated reference count 143 of the snapshot namespace inode 142 is set to a partial weight. The delegated reference count 131 of the primary namespace inode 130 is decremented by the partial weight. Relevant metadata structures are updated to indicate the sharing relationship of the set of files of the primary namespace view. Namespace inode structures 130, 142 of the primary namespace view and the snapshot copy of the primary namespace view are updated to indicate the sharing relationship of the indirect block 134 of the primary namespace inode 130 (step 255). As a result of the sharing relationship of the inode file contained in the indirect block-0 134 of the primary namespace inode 130, each entry in a hierarchical structure of the primary namespace inode 130 implicitly indicates that the inodes of the files included in inode file for the primary namespace view are shared between the primary namespace view and the snapshot copy of the primary namespace view. Further, indirect blocks of a file of the set of files included in the primary namespace view are implicitly shared as well between the primary namespace view and the snapshot copy of the primary namespace view.

Figure 15:
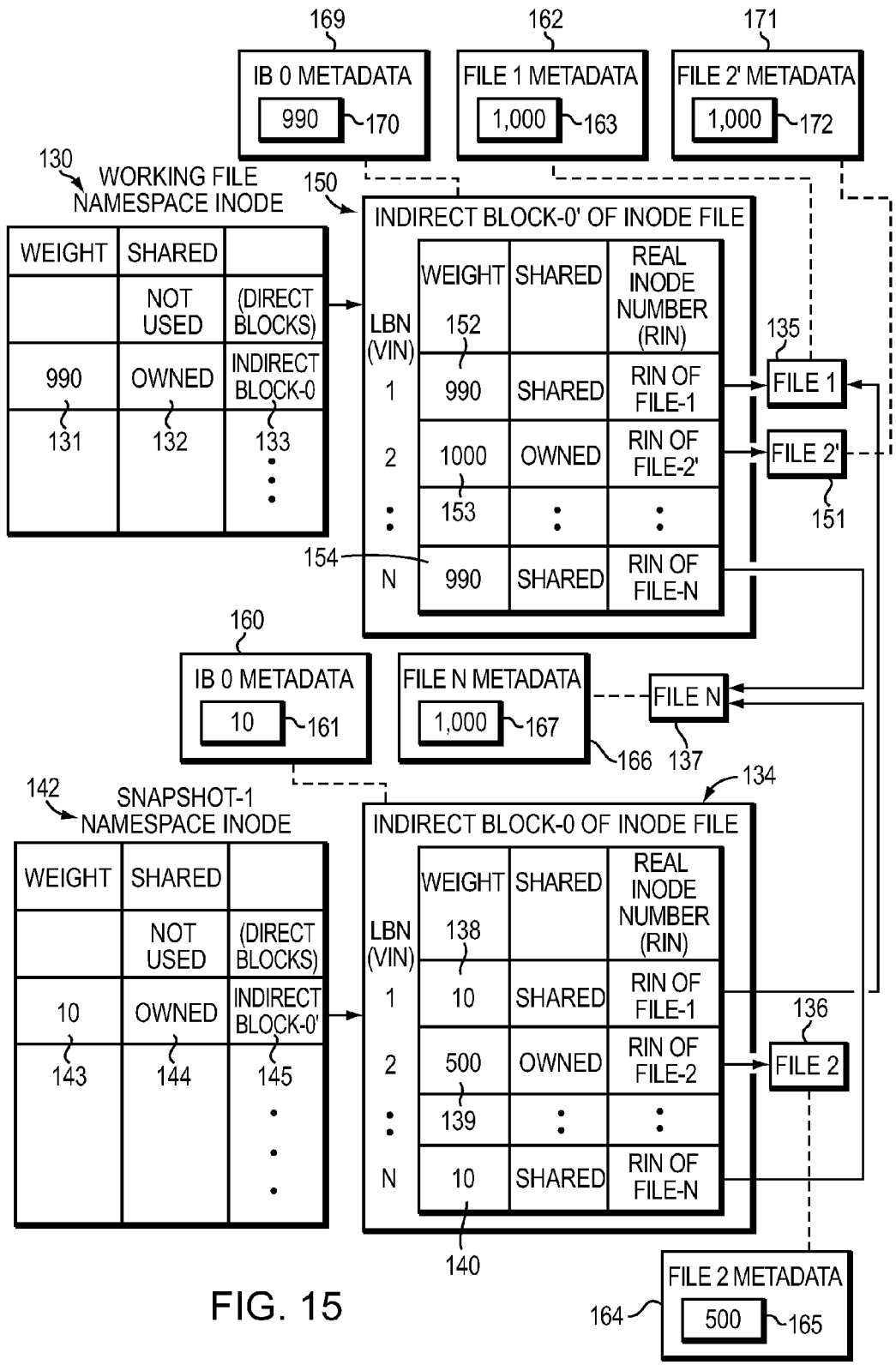
FIG. 15 is a block diagram illustrating in more detail components that may be used in connection with techniques herein.

Referring to FIG. 15, shown is an illustration of an example representing a write operation on a file shared between the primary namespace view and the snapshot copy of the primary namespace view of FIG. 13 that may be included in an embodiment using the techniques described herein. A write operation directed to a file of a primary namespace where the file is shared by the primary namespace and a snapshot copy of the primary namespace results into a change in the contents and/or metadata of the file. Thus, in order to preserve the sharing relationship of the file and other files included in the primary namespace view, an operation known as "inode split" is performed. Similar to the "write split" operation performed on a data block or an indirect block of a file as described herein, the "inode split" operation creates a snapshot copy (or "version") of the inode file included in the primary namespace inode for the primary namespace view using the delegated reference counting mechanism. Further, the inode split operation creates a new real inode for the file on a storage disk. The snapshot copy of the primary namespace inode file becomes the inode file for the snapshot namespace inode. Further, the inode split operation preserves a file handle structure that is used to access a file by not changing the virtual inode number associated with the file when creating the new real inode for the file.

Generally, the write split operation based on the delegated reference counting mechanism is invoked upon receiving a write I/O request for a data block. The write split operation evaluates the shared bit stored in the mapping pointer for the data block to check whether the data block has been shared after application of the snapshot copy facility 52. If the shared bit indicates that the data block has been shared among versions of a file, the write split operation breaks the sharing relationship of the data block and allocates a new data block for the write I/O request. If the mapping pointer that points to the data block resides in a shared indirect block, the sharing relationship of the indirect block is also broken. In such a case, the write split operation causes a new indirect block to be allocated and mapping pointers for all data blocks not involved in the write operation are copied to the new indirect block. The process of copying mapping pointers to the new indirect block includes distributing the delegated reference count values of mapping pointers between the original shared indirect block and the newly allocated indirect block. In addition to the distribution of the delegated reference count values, the shared bits of the copied mapping pointers are updated to indicate that the sharing relationship has been broken. Any reference to the old data block is released and the mapping pointer of the new data block is updated to point to the newly allocated data block. If the shared bit of the data block indicates that the data block has not been shared among versions of a file, contents of the data block are updated according to the write I/O request and the write I/O requests completes.

In at least one embodiment of the current technique, the inode split operation is performed on an inode of a file in a similar way as the write operation is performed on an indirect block. Referring back to FIG. 15, for example, in at least one embodiment of the current technique, upon receiving a write I/O request for a file included in the primary namespace view, the inode split operation creates a version of the inode file of the primary namespace inode 130 for the primary namespace view by creating a version of indirect block-0 134 of primary namespace inode 130 using the delegated reference counting mechanism. Indirect block-0 pointer 133 of the primary namespace inode 130 is updated to point to the indirect block-0' 150 which is a version or snapshot copy of the indirect block-0 134 of the primary namespace inode 130. A new real inode 151 for file-2 136 is created. Indirect block entry 153 of indirect block-0' 150 of the primary namespace inode 130 is updated to point to the newly allocated real inode 151 (indicated as RIN' in FIG. 15) associated with file-2' 151 where file-2' is a version of the file-2 136. Delegated reference count in indirect block entry 153 of indirect block-0' 150 is updated to indicate that file-2' 151 is a version of file-2 136. Further, file-2' 151 is viewed by a user of the primary namespace view as a working-file and file-2 136 is viewed as a point-in-time snapshot copy of the working-file file-2' 151. Further, the primary namespace inode 130 and the snapshot namespace inode 142 structures are updated to indicate that the inode file 134 for the primary namespace view is no longer shared between the primary namespace view and the snapshot copy of the primary namespace view. However, the sharing relationships of other files such as file-1 135, file-n 137 (and other files not shown) is preserved by sharing the inodes of such files. Thus, delegated weights of indirect blocks of the primary namespace inode 130 and snapshot namespace inode 142, files 135, 151, 137, 136 are distributed to indicate the inode split operation described above herein. For example, in at least one embodiment as shown in FIG. 15, delegated weight 170 included in metadata 169 of indirect block-0' 150 is set to 990 and delegated weight 161 included in metadata 160 of indirect block-0 134 is set to 10. Similarly, delegated weight 172 included in metadata 171 of File-2' 151 is set to initial full-weight value of 1,000 and delegated weight 165 included in metadata 164 of file-2 136 is set to 500. Additionally, indirect block entry 152 of indirect block-0' 150 of the primary namespace inode 130 is updated to include delegated reference count of 990 to indicate that file-1 135 pointed to by the entry 152 is shared with snapshot namespace inode file 142. Similarly, indirect block entry 154 of indirect block-0' 150 of the primary namespace inode 130 is updated to include delegated reference count of 990 to indicate that file-n 137 pointed to by the entry 154 is shared with snapshot namespace inode file 142.

Figure 16:
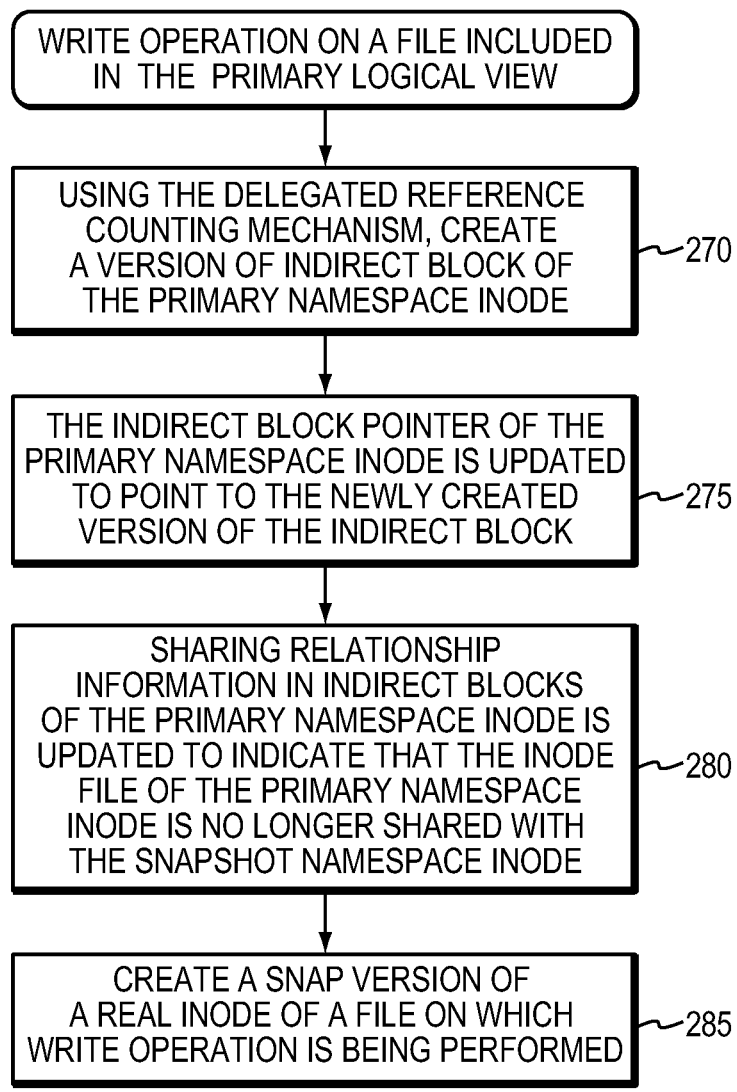
FIG. 16-17 are flow diagrams illustrating processes that may be used in connection with techniques herein.

Referring to FIG. 16, shown is a flow diagram illustrating a flow of data in the data storage system. With reference also to FIGS. 10-15, a write operation on a file included in a primary namespace view and shared between the primary namespace view and a snapshot copy of the primary namespace view results in the inode split of the inode of the file. A version of an inode file stored in an indirect block pointer of the primary namespace inode of the primary namespace view is created by using the delegated reference counting mechanism (step 270). The indirect block pointer of the primary namespace inode is updated to point to the newly created version of the indirect block of the primary namespace inode (step 275). The sharing relationship information in the indirect block of the primary namespace inode is updated to indicate that the inode file of the primary namespace view is no longer shared with the snapshot namespace inode for the snapshot namespace view (step 280). A snapshot copy (or version) of a real inode of the file to which the write operation is directed is created by using the delegated reference counting mechanism (step 285).

Figure 17:
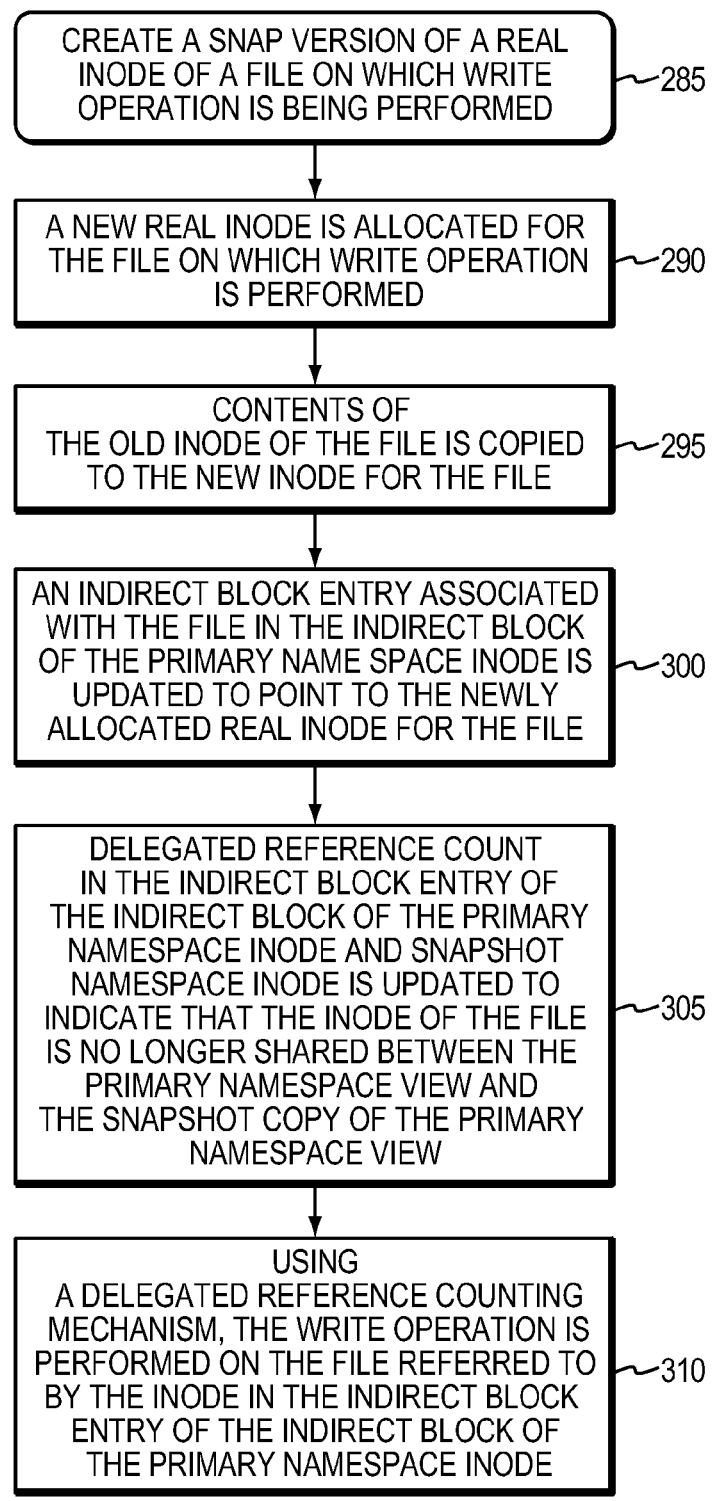

Referring to FIG. 17, shown is a flow diagram illustrating a flow of data in the data storage system. With reference also to FIGS. 10-16, creating a snapshot copy or version of a file of the primary namespace view includes creating a new real inode and allocating the newly allocated real inode to the file (step 290). Contents of the old inode of the file is copied to the newly allocated inode for the file (step 295). An indirect block entry associated with the file in the inode file of the primary namespace inode is updated to point to the newly allocated real inode for the file. However, the virtual inode number associated with the file remains same (step 300). The delegated reference count in the indirect block entry of the primary namespace inode is updated to indicate that the inode of the file is no longer shared between the primary namespace view and the snapshot copy of the primary namespace view (step 305). Further, the sharing relationship information in indirect block entry of the indirect block of the primary namespace inode is updated to indicate that the inode of the file included in the primary namespace view is no longer shared by the snapshot namespace view. The write operation is performed on the file referred to by the real inode in the indirect block entry of the primary namespace inode (step 310).

Figure 18:
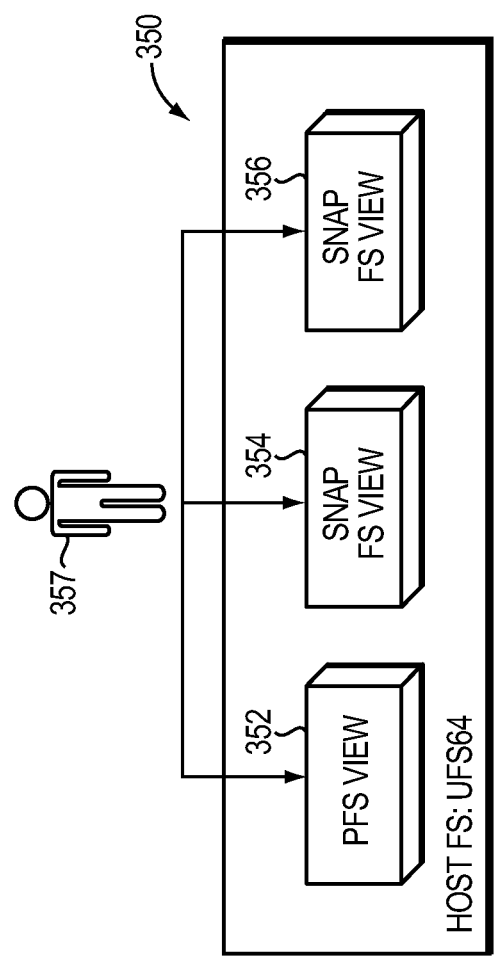
FIGS. 18-29 are diagrams illustrating in more detail components that may be used in connection with techniques herein.

Referring to FIG. 18, shown is a representation of a container file system including a set of logical views that may be included in an embodiment using the current techniques described herein. A file system such as a container file system 350 may include a primary file system namespace 352, a first snapshot copy of the primary file system namespace 354 and a second snapshot copy of the primary file system namespace 356. The container file system 350 acts as a pool of storage for a user 357 of data storage system 10 such that the user 357 may create a set of logical views of storage objects and create snapshot copies of a logical view.

Figure 19:
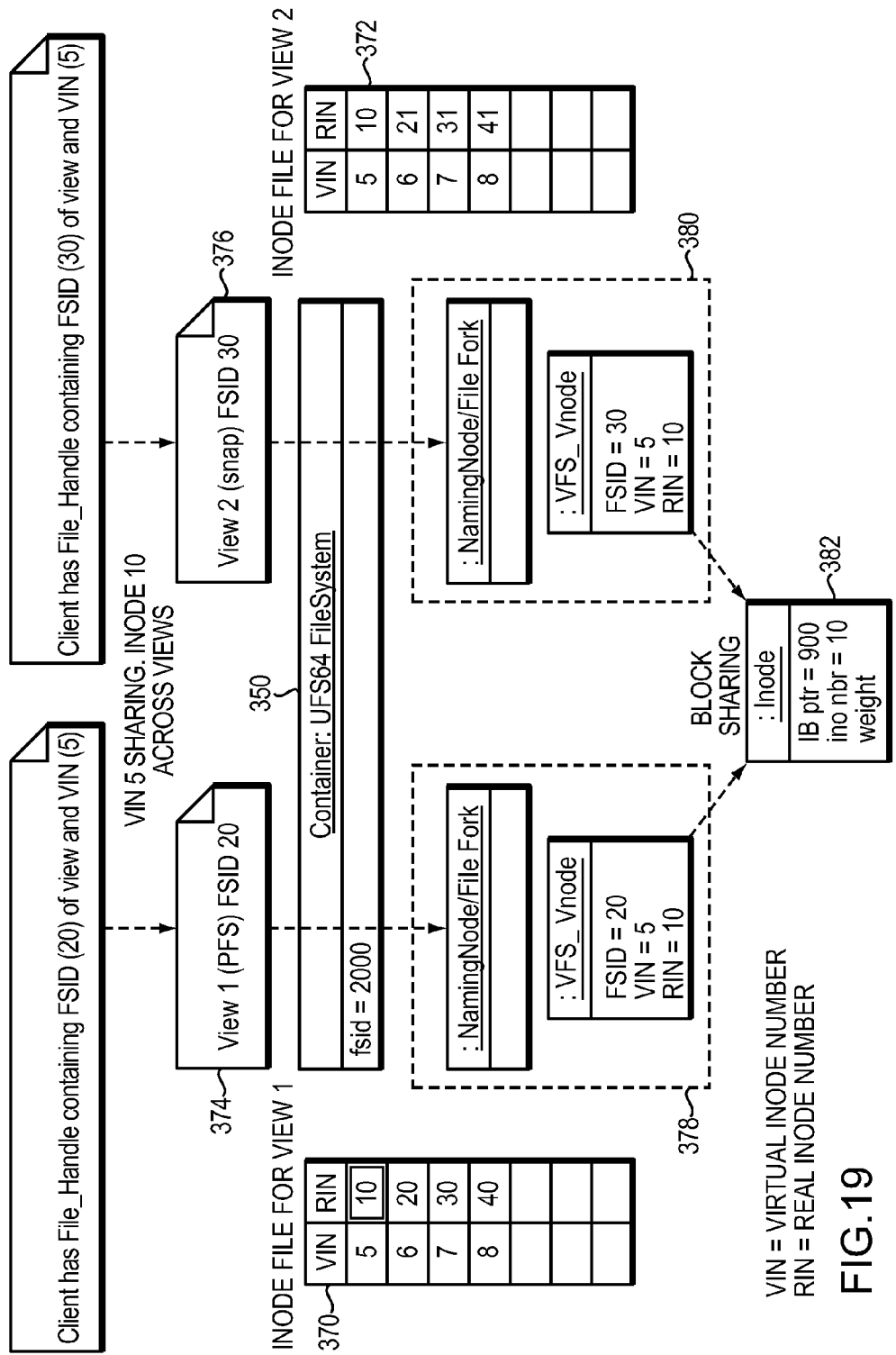

Referring to FIG. 19, shown is an illustration of an example representing sharing of a file between a namespace view and a snapshot copy of the namespace view that may be included in an embodiment using the techniques described herein. For example, in at least one embodiment of the current technique, container file system 350 includes a primary namespace view 374 (indicated as "view 1" in FIG. 19) with a file system identification number as 20, and a snapshot copy 376 (indicated as "view 2" in FIG. 19) of the primary namespace view with a file system identification number as 30. The primary namespace inode file 370 is created for the primary namespace view 374 and snapshot namespace inode file 372 is created for the snapshot namespace view 376. File 382 is shared between the primary namespace view 374 and snapshot namespace view 376. For example, as shown in FIG. 19, value 10 is the real inode of file 382 and value 5 is the virtual inode number for file 382. File 382 is accessed by the users of the primary namespace view and snapshot namespace view by using metadata structures 378, 380. A client of data storage system 10 may access file 382 of the primary namespace view 374 by using a file handle including a file system identifier for the primary namespace view, and virtual inode number of file 382. Similarly, a client of data storage system 10 may access file 382 from the snapshot namespace view 376 by using a file handle including a file system identifier for the snapshot namespace view 376, and virtual inode number of file 382. For example, entire contents of file 382 are shared between the view-1 374 and view-2 376, and thus file 382 is associated with same real inode number. Further, in at least one embodiment of the current technique, file 382 is accessed from the views 374, 374 by using the same virtual inode number that is mapped to a real inode of the file 382 based on a version of the file 382 included in a namespace view.

Figure 20:
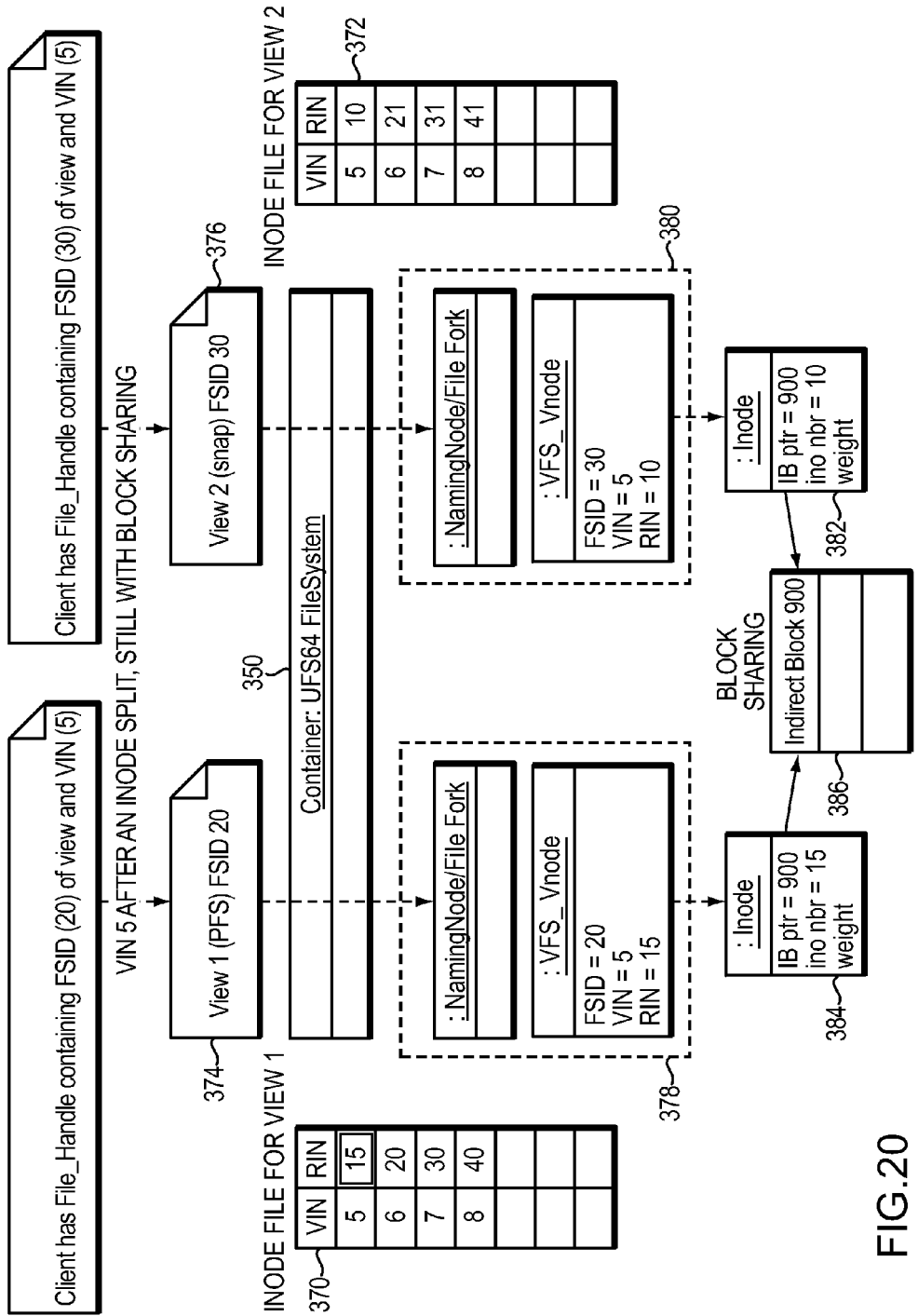

Referring to FIG. 20, shown is an illustration of an example representing versions of an inode of a file shared between the primary namespace view and snapshot namespace view of FIG. 19 that may be included in an embodiment using the techniques described herein. In at least one embodiment of the current technique, when a write operation is performed on file 382, the inode split operation creates a version of the inode of the file 382, and the primary namespace view 374 is updated to point to the newly created version of the inode 384 of the file 382. Further, inode file 370 of the primary namespace view 374 is updated to change the mapping for the file 382 to point to the newly created version of the real inode 384 of the file 382. Contents of file 382 (e.g. indirect block 386) remains shared before a write operation is directed to such contents. It should be noted that inode file 370 for view 1 374 and inode file 372 for view 2 376 are version files. Thus, for example, as shown in FIG. 20, contents of the file associated with inode 384 are accessed from primary namespace view 374 by using the virtual inode number of 5 that is mapped to the real inode number of 15 using the inode file 370 for the primary namespace view 374. Similarly, contents of the file associated with inode 382 are accessed from snapshot namespace view 376 by using the virtual inode number of 5 that is mapped to the real inode number of 10 using the inode file 372 for the snapshot namespace view 376.

Figure 21:
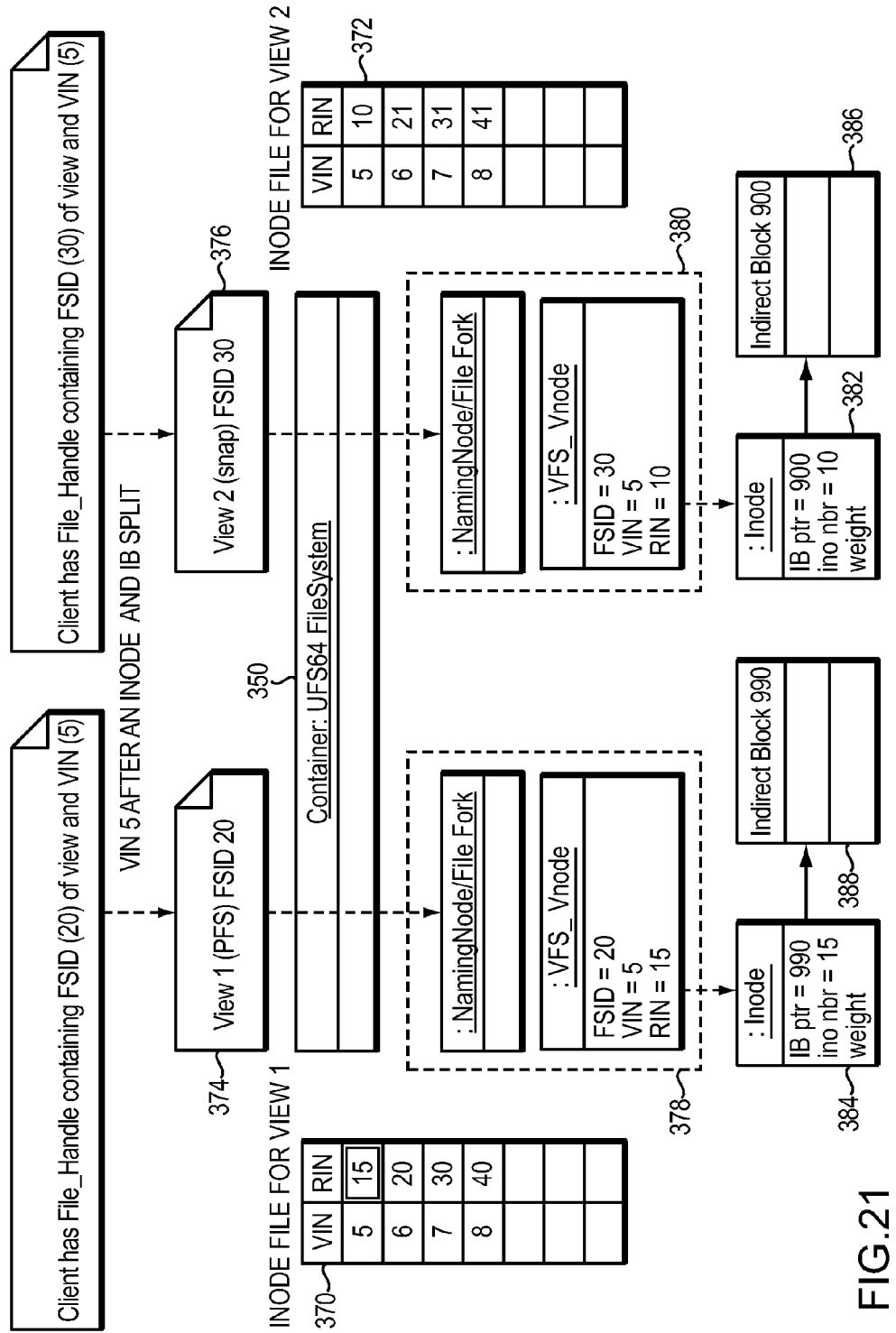

Referring to FIG. 21, shown is an illustration of an example representing a write operation on the file shared between the primary namespace view and the snapshot namespace view of FIG. 19 that may be included in an embodiment using the techniques described herein. With reference also to FIG. 20, when a write operation is directed at data blocks included in indirect block 386 shared between the inodes 384, 382 of the file, indirect block 386 is split by the write split operation using the delegated reference counting mechanism where the version of the indirect block 388 is associated with inode 384 of the file. Contents of file stored in indirect block 388 are updated based on the write operation and the write operations completes successfully.

Figure 22:
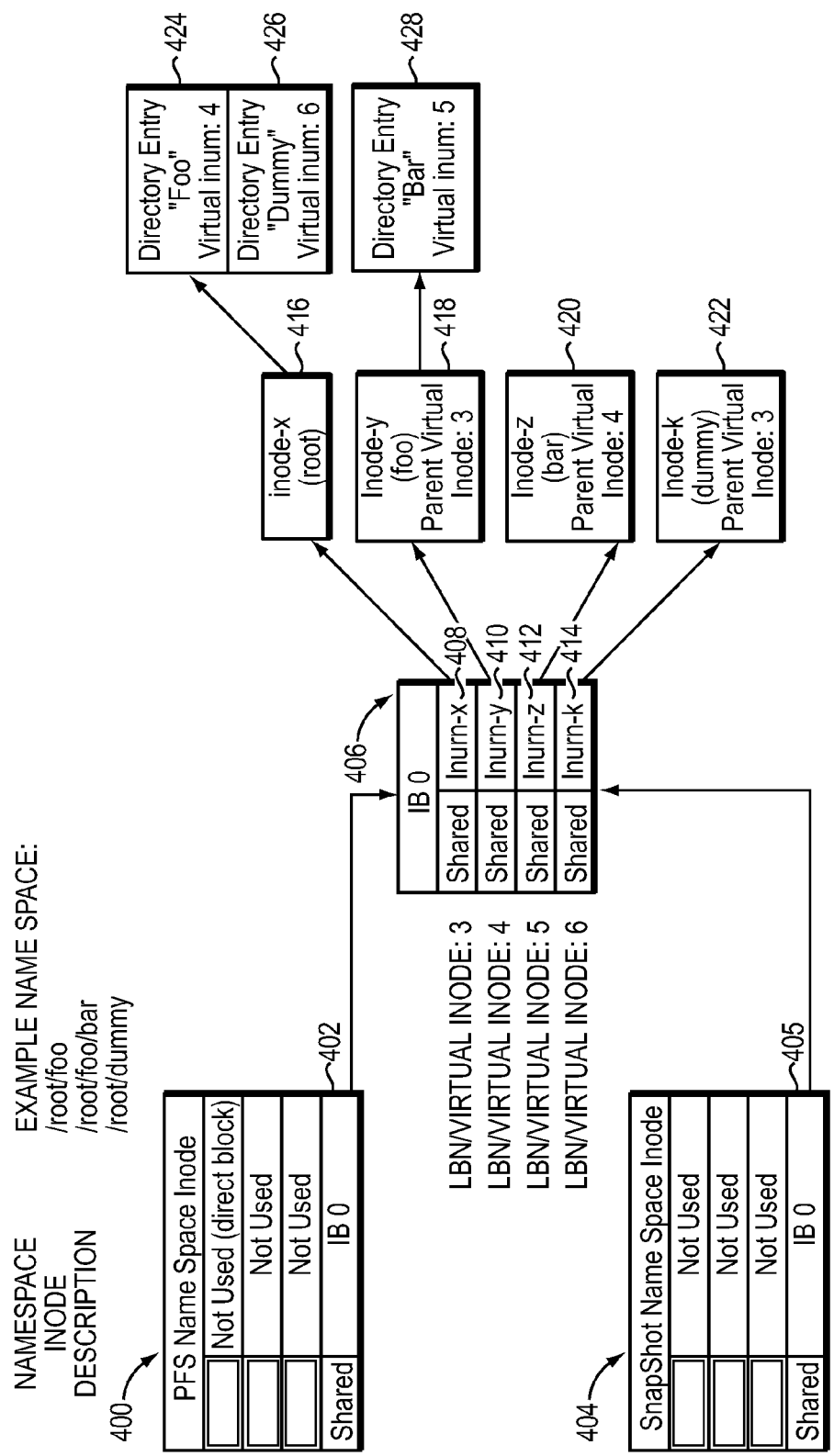

Referring to FIG. 22, shown is an illustration of an example representing a primary namespace view including a set of files and a snapshot copy of the primary namespace view that may be included in an embodiment using the techniques described herein. For example, in at least one embodiment of the current technique, a primary namespace view includes a set of files organized in a hierarchical structure. For example, as shown in FIG. 22, the hierarchical structure includes directory "root" at the top where directory "root" is indicated by inode-x 416. Further, inode-x 416 of directory "root" includes directory named "foo" 424, and directory named "dummy" 426. Directory "foo" 424 is indicated by inode-y 418, and directory "dummy" 426 is indicated by inode-k 422. Further, directory "foo" includes file named "bar" 428 indicated by inode-z 420. Primary namespace inode 400 is created for the primary namespace view. Indirect block-0 pointer 402 of primary namespace inode 400 points to an inode file stored in the indirect block-0 406 of the primary namespace inode 400. A logical block offset within indirect block 406 indicates a virtual inode number for a file included in the primary namespace view. For example, in at least one embodiment, logical block offset number of 3 is associated with inode-x 416 for directory "root", logical block offset number of 4 is associated with inode-y 418 for directory "foo", logical block offset number of 5 is associated with inode-z 420 for directory "bar", and logical block offset number of 6 is associated with inode-k 422 for file "dummy". A snapshot of the primary namespace view is created by creating a version of the primary namespace view inode 400 using the delegated reference counting mechanism. Snapshot namespace inode 404 which is a version of primary namespace inode 400 points to the inode file included in indirect block-0 406. Indirect block entries 408, 410, 412, 414 of indirect block-0 406 indicates mapping of real inodes for files included in the primary namespace view, and the sharing relationship of the files between the primary namespace view and the snapshot namespace view. Thus, inode file including inodes of the set of files of the primary namespace view is shared by the primary namespace view and a snapshot copy of the primary namespace view by sharing inodes of each file of the set of files using the delegated reference counting mechanism.

Figure 23:
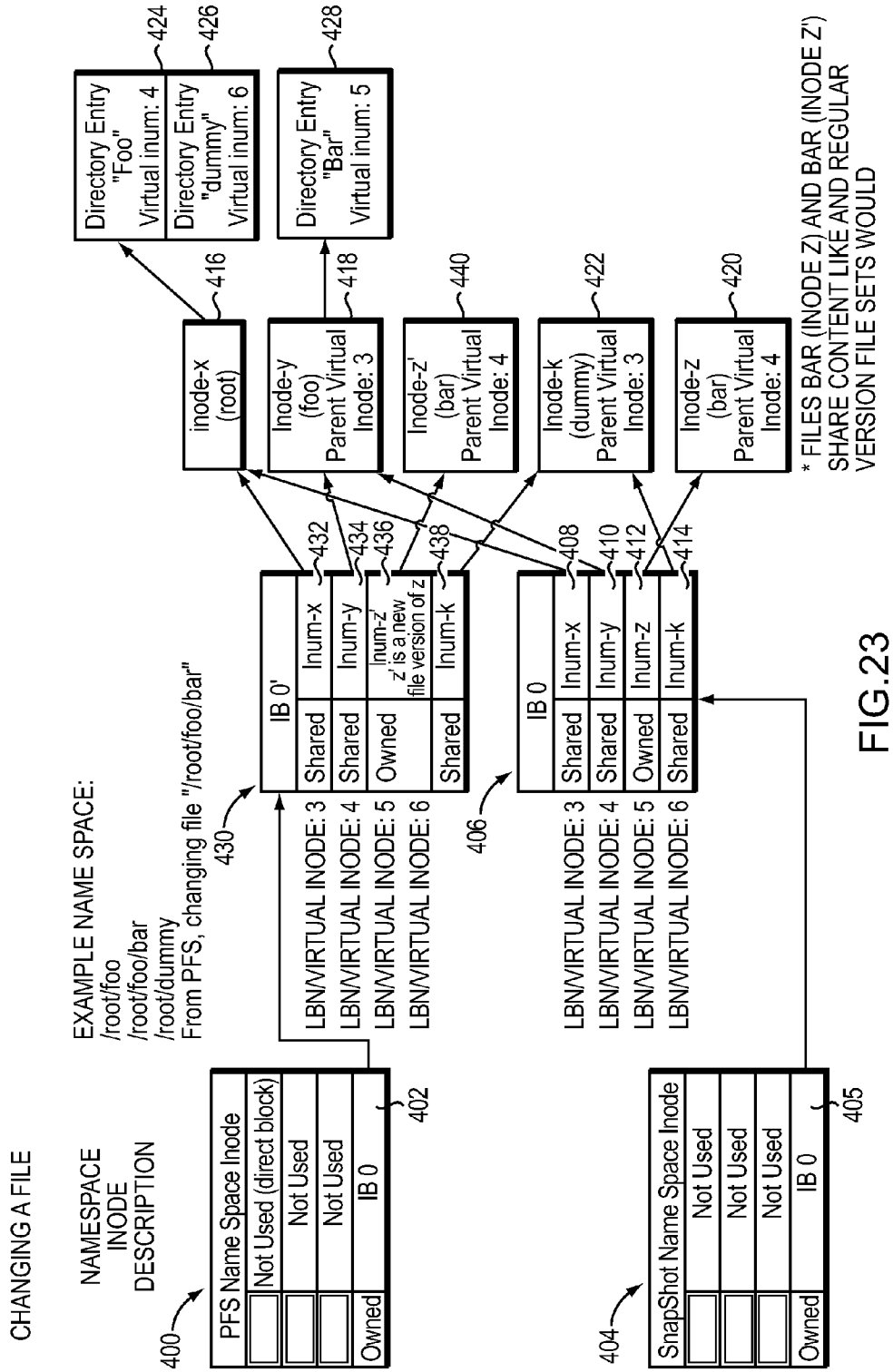

Referring to FIG. 23, shown is an illustration of an example representing a write operation on a file shared between the primary namespace view and the snapshot copy of the primary namespace view shown in FIG. 22 that may be included in an embodiment using the techniques described herein. For example, in at least one embodiment of the current technique, if file named "bar" 428 shown in FIG. 22 is changed by updating contents of the file "bar" 428, the inode split operation creates a version of primary namespace inode 400 using the delegated reference counting mechanism described above herein. Then, the inode split operation creates a version of inode-z 420 associated with file "bar" 428. As a result of the inode split operation, indirect block-0 pointer 402 of primary namespace inode 400 is updated to point to the newly created version of inode file 430 (shown as IB 0' in FIG. 23). Further, new real inode is created and allocated to inode-z' 440 associated with a version of file "bar" 428. Indirect block entry 436 of inode file 430 for primary namespace view is updated to point to inode-z' 440 for newly created version of file "bar". Further, information indicating the sharing relationship of file "bar" 428 is updated to indicate that the primary namespace inode file 430 no longer shares file "bar" 428 with snapshot inode file 406. Even though a version of the inode-z 420 is created, file "bar" 428 represented by inode-z 420 and inode-z' 440 share contents (data block) by using the delegated reference counting mechanism. Further, indirect block entries 432, 434, 438 of inode file 430 of primary namespace inode 400 includes the same information as contained in the indirect block entries 408, 410, 414 of inode file 406 of snapshot namespace inode 404 to preserve the sharing relationship of files and/or directories such as "foo" 424, and "dummy" 426

Figure 24:
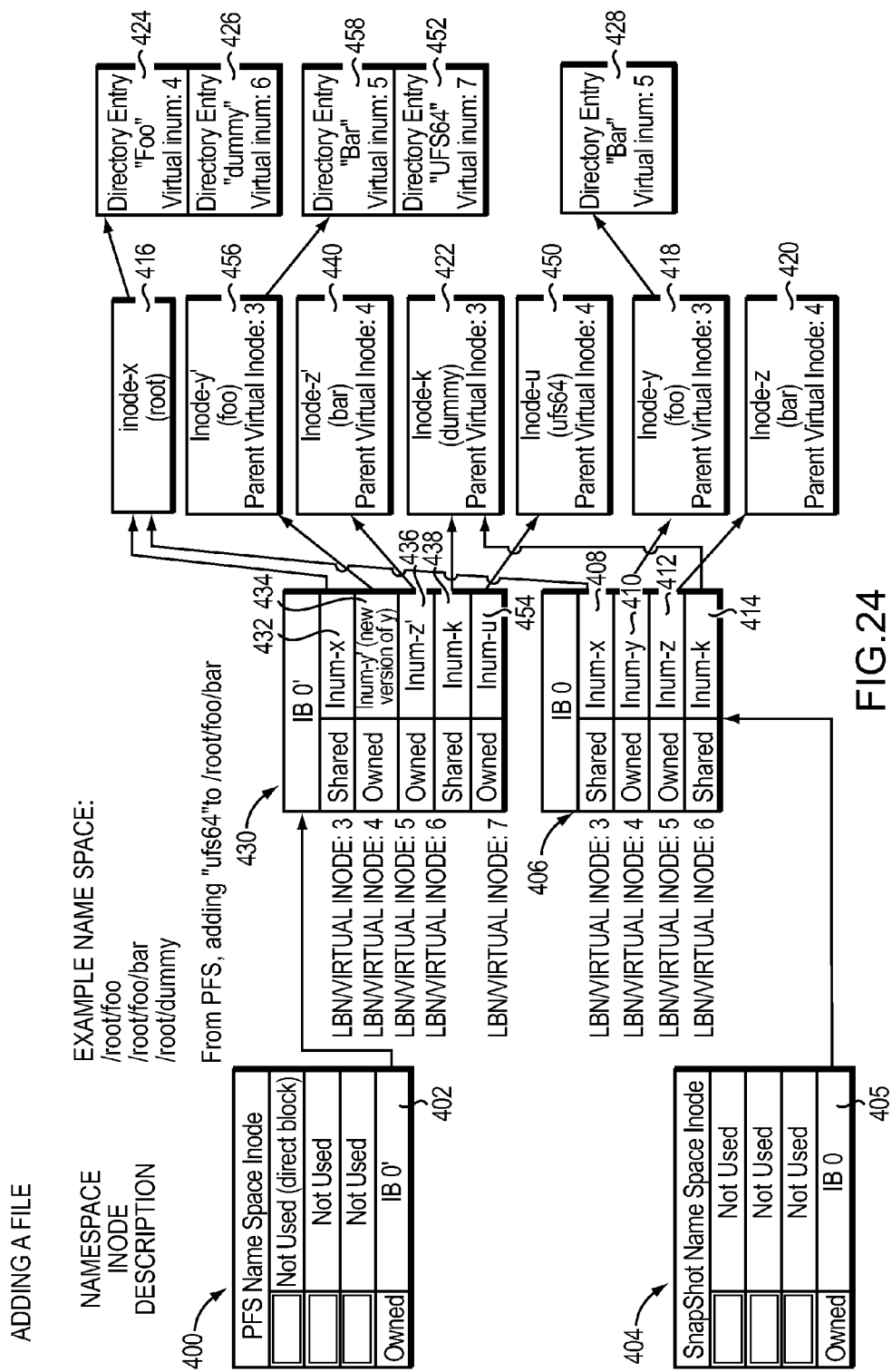

Referring to FIG. 24, shown is an illustration of an example representing an operation of adding a file to the primary namespace view including a set of files and the snapshot copy of the primary namespace view shown in FIG. 22 that may be included in an embodiment using the techniques described herein. For example, in at least one embodiment of the current technique, a new directory named "ufs64" is created under the directory "bar". In order to create a file or directory, a new real inode such as inode-u 450 is created for the directory "ufs64" 452 and is added to indirect block entry 454 of inode file 430 of primary namespace inode 400. The logical block offset value of 7 within indirect block 430 of primary namespace inode 400 is associated with inode-u 450. Thus, a new virtual inode number is created and associated with a new file or directory created in a primary namespace view. Further, adding the directory "ufs64" includes changing metadata of the directory "bar" 428 under which directory "ufs64" 452 is added, and thus a new version (or snapshot copy) of the directory "bar" 458 is created by using the delegated reference counting mechanism. Creating a new version of a file or directory includes splitting the inode for the file. Thus, a new version of inode-y 418 is created as inode-y' 456 such that the indirect block entry 434 of inode file 430 for primary namespace inode 400 is updated to point to inode-y' 456 created for the newly created version of directory "bar" 458.

Figure 25:
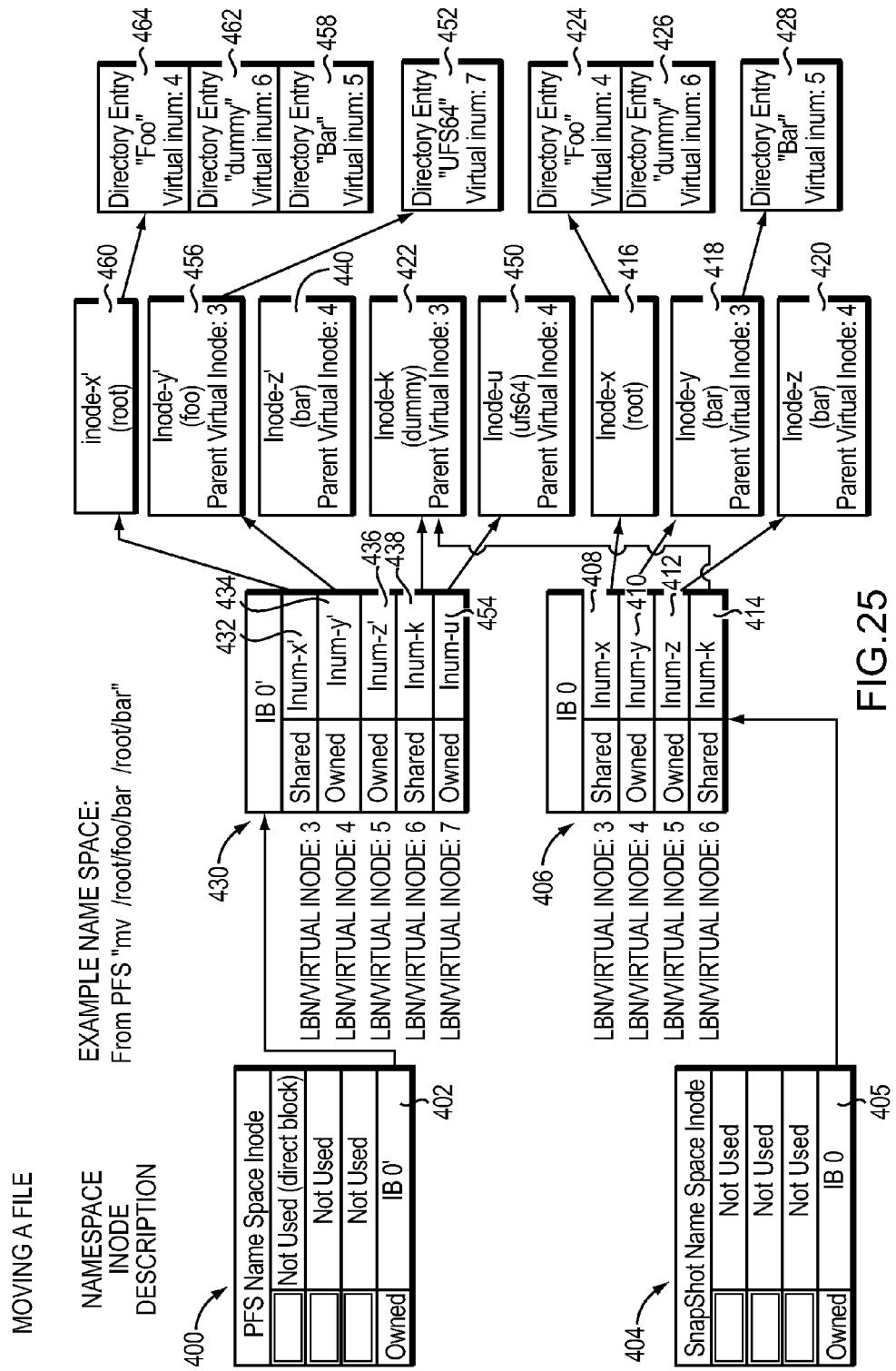

Referring to FIG. 25, shown is an illustration of an example representing an operation of moving a file included in the primary namespace view and the snapshot copy of the primary namespace view shown in FIG. 24 that may be included in an embodiment using the techniques described herein. For example, in at least one embodiment, directory entry "bar" 458 is moved from the directory "foo" 424 to the directory "root". Moving the directory "bar" 458 to the directory "root" includes updating metadata of the directory "root", and thus involves the inode split operation that creates a version of the inode of the directory "root" using the delegated reference counting mechanism. Inode-x' 460 is created as a version of inode-x 416 for the directory "root". Indirect block entry 432 of inode file 430 for the primary namespace view is updated to point to inode-x' 460 for the version of the directory "root". In at least one embodiment of the current technique, a hierarchical structure in which a set of storage objects are organized is preserved by keeping the virtual inode number same for a storage object when a version of the storage object is created, and in turns enables a storage object to move within the hierarchical structure without any impact on how the storage object is accessed by users of a data storage system.

Figure 26:
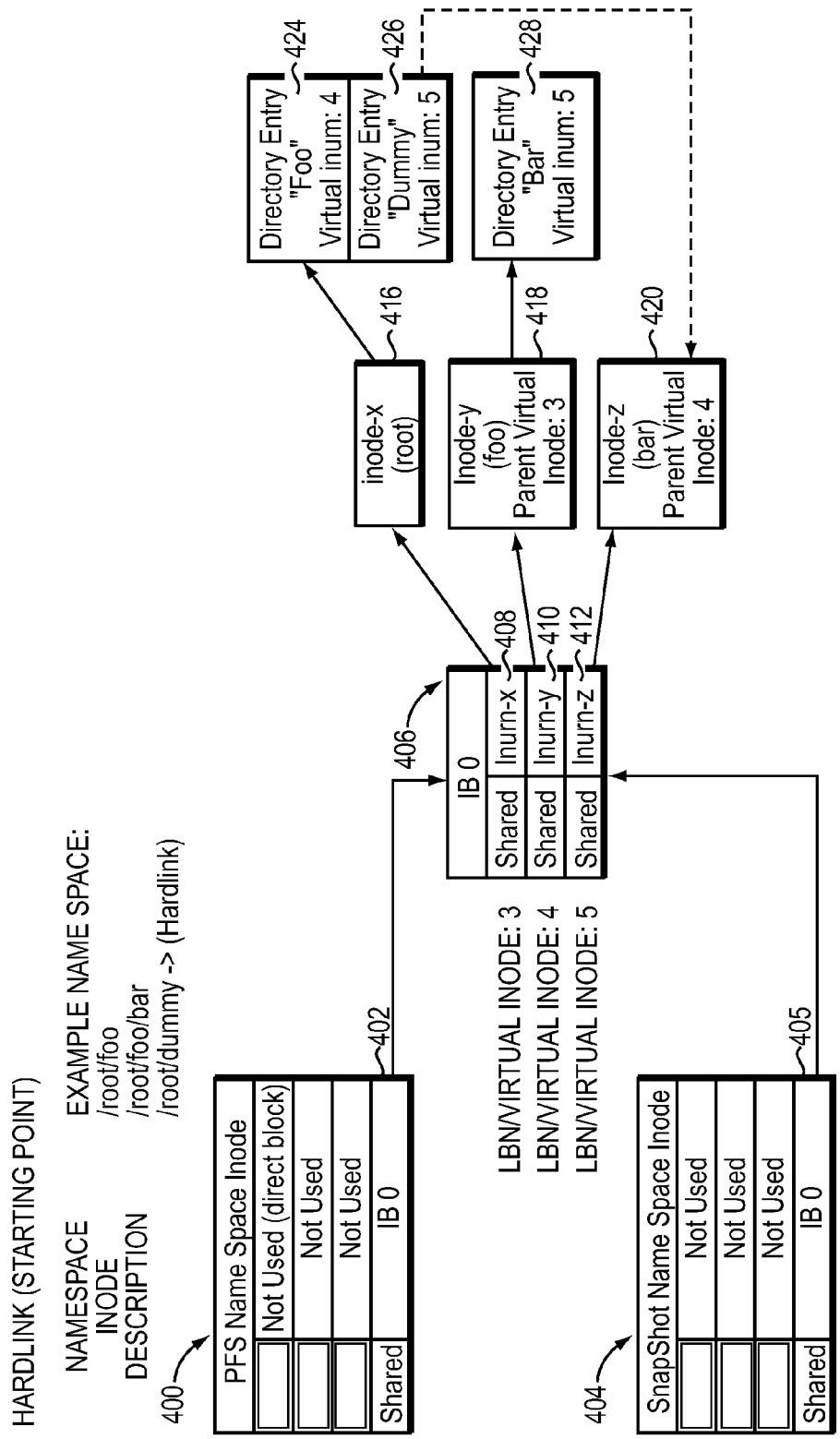

Referring to FIG. 26, shown is an illustration of an example representing an operation of creating a hard link for a file of the primary namespace view shown in FIG. 22 that may be included in an embodiment using the techniques described herein. A hard link for a file contains the location on a disk indicating where the file or directory may be found on the disk, as opposed to a soft (or symbolic) link, which is a logical pointer. Moving a file within a filesystem may not break an association of a hard link for the file, but may break an association of a soft link for the file. For example, in one embodiment of the current technique, directory "dummy" 426 is a hard link pointing to directory entry "bar" 428. In such an example, directory entry "dummy" 426 includes inode-z 420 associated with directory entry "bar" 428.

Figure 27:
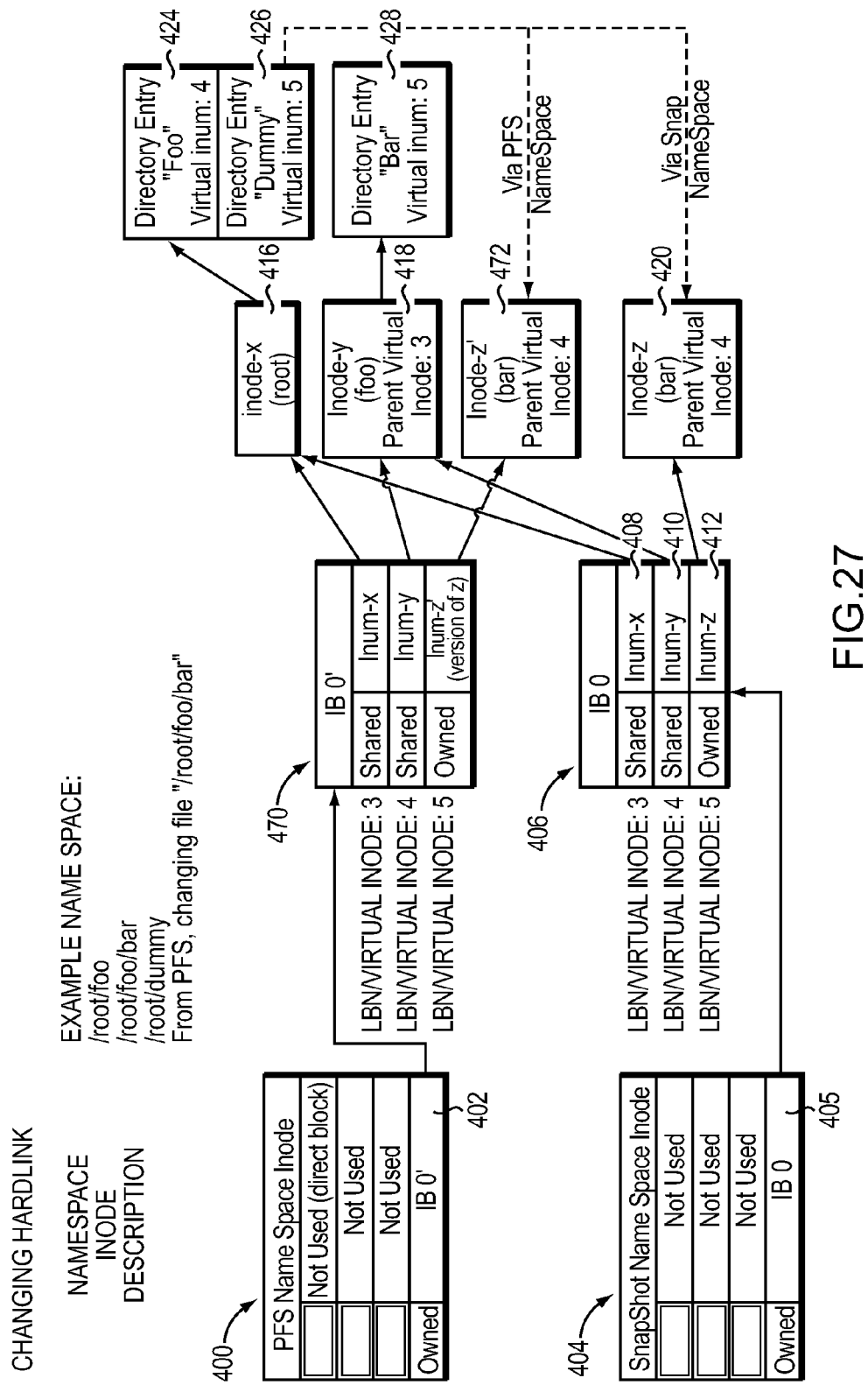

Referring to FIG. 27, shown is an illustration of an example representing an operation of changing the hard link for the file shown in FIG. 26 that may be included in an embodiment using the techniques described herein. With reference also to FIG. 26, changing the hard link "dummy" results in update of directory entry "bar" 428 as the hard link "dummy" includes the inode for "bar" 428. Thus, in at least one embodiment of the current technique, updating directory "bar" 428 results in the inode split of the inode-z 420 for directory "bar" 428. The inode split operation creates a version of the inode file 406 using the delegated reference counting mechanism as described above herein. Thus, indirect block pointer 402 of primary namespace inode 400 is updated to point to indirect block-0' 470 that is created as a version of the indirect block-0 406. Further, a new real inode inode-z' 472 is created for directory entry "bar" 428, and indirect block entry of the inode file 470 of the primary namespace inode 400 is updated to point to inode-z' 472. Thus, a user may access the directory entry "bar" associated with inode-z' 472 when accessing the hard link "dummy" from the primary namespace view and the directory entry "bar" associated with inode-z 420 when accessing the hard link "dummy" from the snapshot namespace view.

Figure 28:
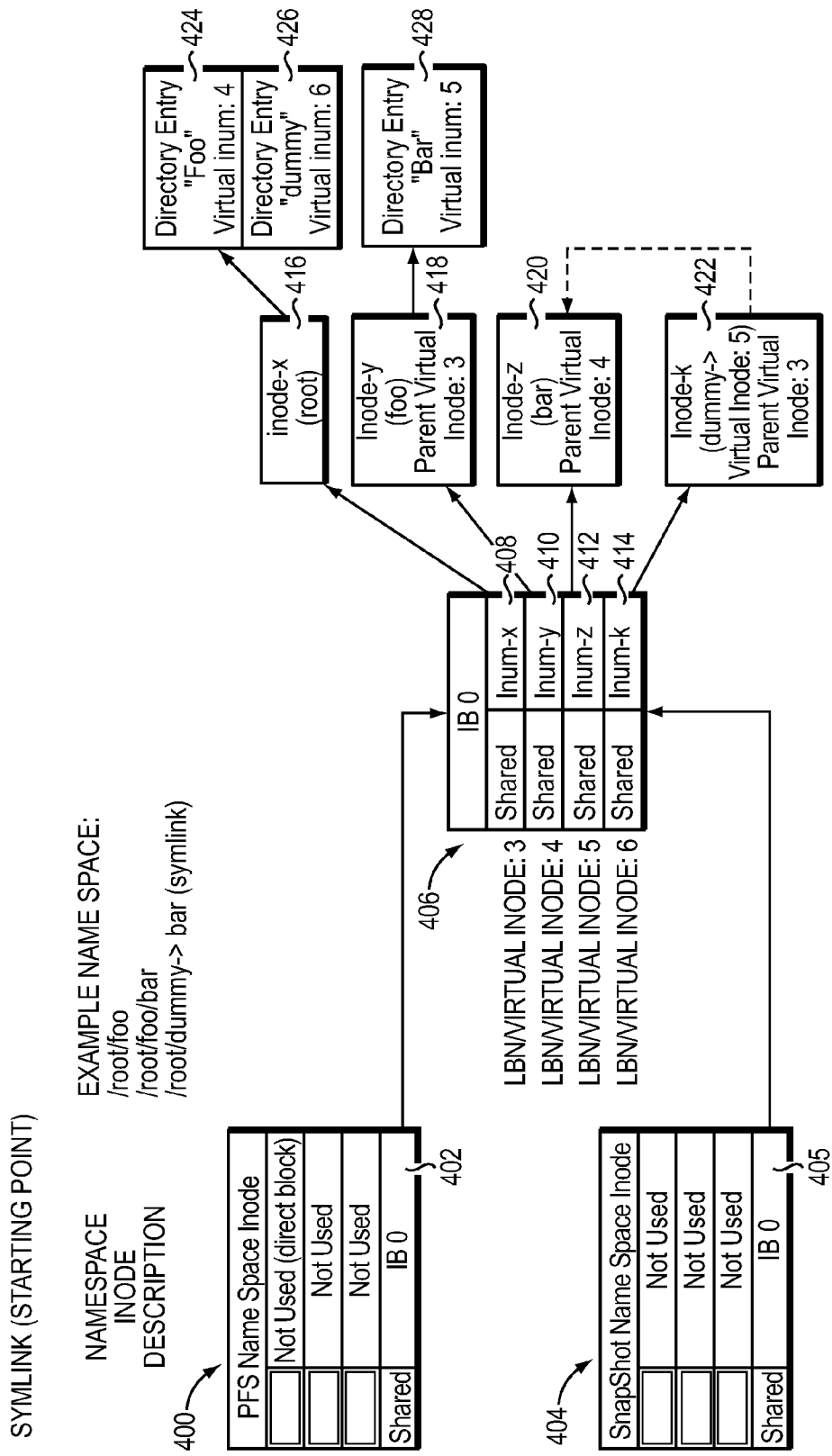

Referring to FIG. 28, shown is an illustration of an example representing an operation of creating a symbolic link for a file of the primary namespace view and the snapshot copy of the primary namespace view shown in FIG. 26 that may be included in an embodiment using the techniques described herein. A soft (or symbolic) link for a file is a logical pointer to the file. For example, in one embodiment of the current technique, directory "dummy" 426 is a symbolic link pointing to directory entry "bar" 428. In such an example, inode-k 422 for directory entry "dummy" 426 points to inode-z 420 for directory entry "bar" 428.

Figure 29:
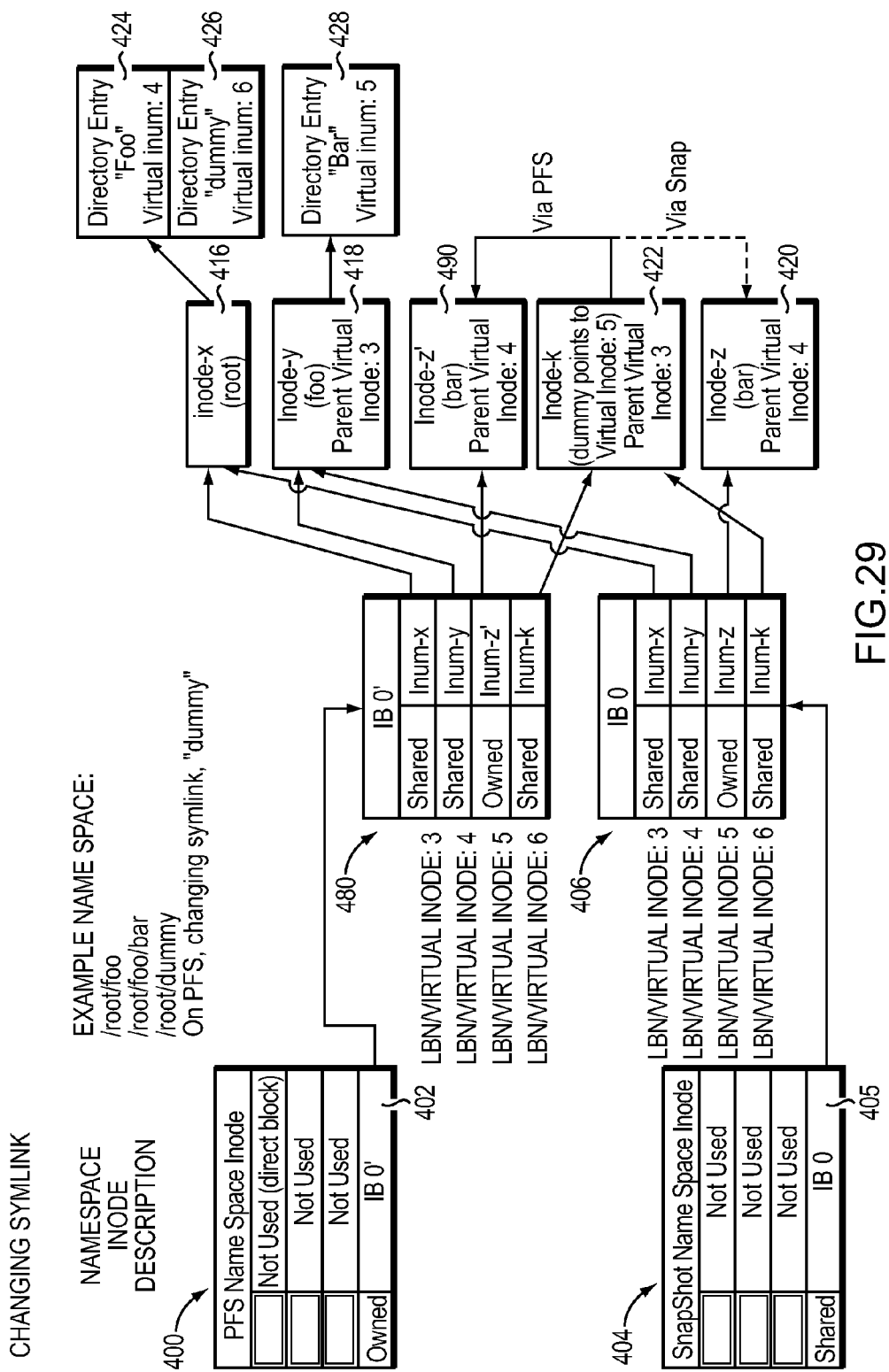

Referring to FIG. 29, shown is an illustration of an example representing an operation of changing the symbolic link for the file shown in FIG. 28 that may be included in an embodiment using the techniques described herein. With reference also to FIG. 28, changing the symbolic link "dummy" results in update of directory entry "bar" 428 as the symbolic link "dummy" points to the inode for "bar" 428. Thus, in at least one embodiment of the current technique, updating directory "bar" 428 results in the inode split of the inode-z 420 for directory "bar" 428. The inode split operation creates a version of the inode file 406 using the delegated reference counting mechanism as described above herein. Thus, indirect block pointer 402 of primary namespace inode 400 is updated to point to indirect block-0' 480 that is created as a version of the indirect block-0 406. Further, a new real inode inode-z' 490 is created for directory entry "bar" 428, and indirect block entry of the inode file 480 of the primary namespace inode 400 is updated to point to inode-z' 490. Thus, a user may access the directory entry "bar" associated with inode-z' 490 when accessing the symbolic link "dummy" from the primary namespace view and the directory entry "bar" associated with inode-z 420 when accessing the symbolic link "dummy" from the snapshot namespace view.

In at least one embodiment of the current invention, deleting a file of a namespace view that is shared by the namespace view and a snapshot copy of the namespace view includes returning the delegated weight stored in the inode of the file to delegated reference count stored in the indirect block entry of the indirect block of the namespace inode for the namespace view. If the file is no longer shared and is owned by the inode file of the namespace view, the file is deleted. Deleting a namespace view includes truncating the namespace inode associated with the namespace view to the length of zero bytes.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing logical views of storage, the method comprising:
    creating a logical namespace view, wherein the logical namespace view indicates a logical collection of a set of storage objects, wherein a storage object includes a file;
    creating a mapping object for the logical namespace view, wherein the mapping object includes a namespace inode, wherein the mapping object manages access to the set of storage objects of the logical namespace view, wherein the namespace inode includes a mapping information for each storage object of the set of storage objects, wherein the mapping information includes sharing information for each storage object of the set of storage objects indicating whether the storage object is shared by at least two versions of the storage object, a real inode of each storage object of the set of storage objects, and a virtual inode for each storage object of the set of storage objects, wherein the mapping information for a storage object associates a real inode of the storage object to a virtual inode for the storage object; and
    creating a snapshot copy of the logical namespace view, wherein the snapshot copy of the logical namespace view shares a subset of the set of storage objects with the logical namespace view by creating a version of the namespace inode of the logical namespace view, wherein the version of the namespace inode points to the mapping information of the namespace inode of the logical namespace view and manages access to the snapshot copy.

2. The method of claim 1, further comprising
    detecting a change in contents of a storage object of the set of storage objects;
    creating a first and second versions of the mapping object, wherein the logical view refers to the first version of the mapping object and the snapshot copy refers to the second version of the mapping object; and
    creating a first and second versions of the storage object, wherein the logical view refers to the first version of the storage object and the snapshot copy refers to the second version of the storage object.

3. The method of claim 1, wherein the storage object is selected from the group consisting of a logical volume and a file, wherein the logical volume is a logical representation of a subset of a physical disk storage, wherein the file is associated with an inode, wherein the inode of the file includes a distributed weight and a virtual parent inode number.

4. The method of claim 3, wherein a file handle associated with a file includes a virtual inode number for accessing the file.

5. The method of claim 1, further comprising:
    receiving a request to add a storage object to the logical view;
    creating an entry in the mapping object; and
    adding the storage object to the mapping object by creating a new mapping for the storage object.

6. A method for use in managing logical views of storage, the method comprising:
    creating a logical namespace view, wherein the logical namespace view includes a point in time copy of a set of files, wherein the logical namespace view indicates a logical collection of the point in time copy of the set of files;
    creating a namespace inode for the logical namespace view, wherein the namespace inode manages access to files of the set of files of the logical namespace view, wherein the namespace inode includes a mapping information for each file of the set of files, wherein the mapping information includes sharing information for each file of the set of files indicating whether the file is shared by at least two versions of the file, a real inode of each file of the set of files, and a virtual inode for each file of the set of files, wherein the mapping information for a file associates a real inode of the file to a virtual inode for the file; and
    creating a snapshot copy of the logical namespace view, wherein the snapshot copy shares a subset of the set of files with the logical namespace view by creating a version of the namespace inode of the logical namespace view, wherein the version of the namespace inode points to the mapping information of the namespace inode of the logical namespace view and manages access to the snapshot copy.

7. The method of claim 6, further comprising
    detecting a change in contents of a file of the set of files;

creating a first and second versions of contents of the namespace inode, wherein the logical namespace view refers to the first version of contents of the namespace inode and the snapshot copy refers to the second version of contents of the namespace inode; and creating a first and second versions of an inode of the file, wherein the logical namespace view refers to the first version of the inode of the file and the snapshot copy refers to the second version of the inode of the file.

8. The method of claim 6, wherein a file of the set of files is associated with an inode, wherein the inode of the file includes a distributed weight and a virtual parent inode number.

9. The method of claim 6, wherein a file handle associated with a file of the set of files includes a virtual inode number for accessing the file.

10. The method of claim 6, wherein a mapping for a real inode of a file of the set of files is associated with a virtual inode number of the file, wherein a logical offset indicates a virtual inode number of a file.

11. The method of claim 6, wherein creating a version of the namespace inode further comprising:

updating an indirect block pointer of the namespace inode of the logical namespace view to point to the version of the namespace inode; and distributing a delegated weight between the namespace inode and the version of the namespace inode.

12. The method of claim 6, further comprising:

receiving a request to add a file to the logical namespace view;

creating an entry in the namespace inode of the logical namespace view; and adding the file to the namespace inode at a logical offset, wherein the logical offset indicates a virtual inode number associated with a real inode of the file.

13. A system for use in managing logical views of storage, the system comprising:

a processor;

first logic creating a logical namespace view, wherein the logical namespace view indicates a logical collection of a set of storage objects stored on a storage system, wherein a storage object includes a file;

second logic creating a mapping object for the logical namespace view on the storage system, wherein the mapping object includes a namespace inode, wherein the mapping object manages access to the set of storage objects of the logical namespace view, wherein the namespace inode includes a mapping information for each storage object of the set of storage objects, wherein the mapping information includes sharing information for each storage object of the set of storage objects indicating whether the storage object is shared by at least two versions of the storage object, a real inode of each storage object of the set of storage objects, and a virtual inode for each storage object of the set of storage objects, wherein the mapping information for a storage object associates a real inode of a the storage object to a virtual inode for the storage object; and third logic creating a snapshot copy of the logical namespace view, wherein the snapshot copy of the logical namespace view shares a subset of the set of storage objects with the logical namespace view by creating a version of the namespace inode of the logical namespace view, wherein the version of the namespace inode points to the mapping information of the namespace inode of the logical namespace view and manages access to the snapshot copy.

14. The system of claim 13, further comprising fourth logic detecting a change in contents of a storage object of the set of storage objects;

fifth logic creating a first and second versions of the mapping object, wherein the logical view refers to the first version of the mapping object and the snapshot copy refers to the second version of the mapping object; and sixth logic creating a first and second versions of the storage object, wherein the logical view refers to the first version of the storage object and the snapshot copy refers to the second version of the storage object.

15. The system of claim 13, wherein the storage object is selected from the group consisting of a logical volume and a file, wherein the logical volume is a logical representation of a subset of a physical disk storage, wherein the file is associated with an inode, wherein the inode of the file includes a distributed weight and a virtual parent inode number.

16. A system for use in managing logical views of storage, the system comprising:

a processor;

first logic creating a logical namespace view, wherein the logical namespace view includes a point in time copy of a set of files stored on a storage system, wherein the logical namespace view indicates a logical collection of the point in time copy of the set of files;

second logic creating a namespace inode for the logical namespace view on the storage system, wherein the namespace inode manages access to files of the set of files of the logical namespace view, wherein the namespace inode includes a mapping information for each file of the set of files, wherein the mapping information includes sharing information for each file of the set of files indicating whether the file is shared by at least two versions of the file, a real inode of each file of the set of files, and a virtual inode for each file of the set of files, wherein the mapping information for a file associates a real inode of the file to a virtual inode for the file; and third logic creating a snapshot copy of the logical namespace view, wherein the snapshot copy shares a subset of the set of files with the logical namespace view by creating a version of the namespace inode of the logical namespace view, wherein the version of the namespace inode points to the mapping information of the namespace inode of the logical namespace view and manages access to the snapshot copy.

17. The system of claim 16, further comprising fourth logic detecting a change in contents of a file of the set of files;

fifth logic creating a first and second versions of contents of the namespace inode, wherein the logical namespace view refers to the first version of contents of the namespace inode and the snapshot copy refers to the second version of contents of the namespace inode; and sixth logic creating a first and second versions of an inode of the file, wherein the logical namespace view refers to the first version of the inode of the file and the snapshot copy refers to the second version of the inode of the file.

18. The system of claim 16, wherein a file of the set of files is associated with an inode, wherein the inode of the file includes a distributed weight and a virtual parent inode number.

19. The system of claim 16, wherein a file handle associated with a file of the set of files includes a virtual inode number for accessing the file.

20. The system of claim 16, wherein a mapping for a real inode of a file of the set of files is associated with a virtual inode number of the file, wherein a logical offset indicates a virtual inode number of a file.

* * * * *